United States Patent
Nayak et al.

(10) Patent No.: US 10,992,637 B2
(45) Date of Patent: Apr. 27, 2021

(54) DETECTING HARDWARE ADDRESS CONFLICTS IN COMPUTER NETWORKS

(71) Applicant: Juniper Networks, Inc., Sunnyvale, CA (US)

(72) Inventors: Manoj Nayak, Bangalore (IN); Tabrez Ahmed Khan, Bangalore (IN); Rafik Puttur, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 302 days.

(21) Appl. No.: 16/050,983

(22) Filed: Jul. 31, 2018

(65) Prior Publication Data
US 2020/0045011 A1    Feb. 6, 2020

(51) Int. Cl.
*H04L 29/12*  (2006.01)
*G06F 9/455*  (2018.01)

(52) U.S. Cl.
CPC ...... *H04L 61/2046* (2013.01); *G06F 9/45558* (2013.01); *H04L 61/103* (2013.01); *H04L 61/2069* (2013.01); *H04L 61/6022* (2013.01); *G06F 2009/45595* (2013.01)

(58) Field of Classification Search
CPC ......... G06F 2009/45595; H04L 61/103; H04L 61/2046; H04L 61/6022
See application file for complete search history.

(56) References Cited

U.S. PATENT DOCUMENTS

| | | |
|---|---|---|
| 6,243,749 B1 | 6/2001 | Sitaraman et al. |
| 6,247,060 B1 * | 6/2001 | Boucher ............ G06F 5/10 709/230 |
| 6,578,074 B1 | 6/2003 | Bahlmann |
| 6,957,276 B1 | 10/2005 | Bahl |
| 6,982,953 B1 | 1/2006 | Swales |
| 7,178,059 B2 | 2/2007 | Greenspan et al. |
| 7,197,549 B1 | 3/2007 | Salama et al. |
| 7,292,538 B1 | 11/2007 | O'Rourke et al. |

(Continued)

FOREIGN PATENT DOCUMENTS

| | | |
|---|---|---|
| EP | 3382998 A1 | 10/2018 |
| JP | 2004356920 A | 12/2004 |

(Continued)

OTHER PUBLICATIONS

"Address Resolution Protocol," Wikipedia, retrieved Mar. 25, 2017, 7 pp.

(Continued)

*Primary Examiner* — Minh Chau Nguyen
*Assistant Examiner* — Jonathan A Sparks
(74) *Attorney, Agent, or Firm* — Shumaker & Sieffert, P.A.

(57) ABSTRACT

In general, techniques are described for detecting duplicate hardware addresses in network devices of a computer network. A network device sends a request message on a network, the request message specifying the range of hardware addresses starting from the target hardware address. A network device determines whether at least a subset of the range of hardware addresses starting from the target hardware address is available based on response messages received from other network devices. The network device then reserves the available addresses for assigning to virtual machines (VMs) executing on the network device.

26 Claims, 9 Drawing Sheets

(56) References Cited

U.S. PATENT DOCUMENTS

| | | | |
|---|---|---|---|
| 7,321,893 B1 | 1/2008 | Rambacher et al. | |
| 7,386,629 B2 | 6/2008 | Rover et al. | |
| 7,533,165 B2 | 5/2009 | Makino | |
| 7,624,181 B2 | 11/2009 | Townsley et al. | |
| 7,648,070 B2 | 1/2010 | Droms et al. | |
| 7,792,942 B1 | 9/2010 | Regan et al. | |
| 7,991,863 B2 | 8/2011 | Zhao | |
| 8,036,237 B2 | 10/2011 | Kolli et al. | |
| 8,631,100 B2 | 1/2014 | Gandhewar et al. | |
| 8,792,502 B2 | 7/2014 | Rajamanickam et al. | |
| 9,166,872 B2* | 10/2015 | Cao | H04L 61/2046 |
| 10,601,766 B2 | 3/2020 | Wackerly et al. | |
| 2001/0017857 A1 | 8/2001 | Matsukawa | |
| 2003/0076805 A1 | 4/2003 | Agrawal et al. | |
| 2004/0030769 A1 | 2/2004 | Lim et al. | |
| 2004/0081122 A1 | 4/2004 | Koodli et al. | |
| 2004/0083306 A1 | 4/2004 | Gloe | |
| 2004/0148398 A1 | 7/2004 | Park | |
| 2005/0044273 A1 | 2/2005 | Bouchat et al. | |
| 2005/0066035 A1 | 3/2005 | Williams et al. | |
| 2005/0097223 A1 | 5/2005 | Shen et al. | |
| 2005/0122946 A1 | 6/2005 | Won | |
| 2005/0132209 A1 | 6/2005 | Hug et al. | |
| 2005/0235000 A1 | 10/2005 | Keil | |
| 2005/0253718 A1 | 11/2005 | Droms et al. | |
| 2005/0253722 A1 | 11/2005 | Droms et al. | |
| 2006/0020796 A1 | 1/2006 | Aura et al. | |
| 2006/0020807 A1 | 1/2006 | Aura et al. | |
| 2006/0031488 A1 | 2/2006 | Swales | |
| 2006/0047791 A1 | 3/2006 | Bahl | |
| 2006/0155563 A1 | 7/2006 | Banerjee et al. | |
| 2006/0221846 A1 | 10/2006 | Dyck et al. | |
| 2006/0239266 A1 | 10/2006 | Babbar et al. | |
| 2007/0002833 A1 | 1/2007 | Bajic | |
| 2007/0073882 A1 | 3/2007 | Brown et al. | |
| 2007/0180499 A1 | 8/2007 | Van Bemmel | |
| 2007/0203999 A1 | 8/2007 | Townsley et al. | |
| 2007/0214352 A1 | 9/2007 | Convery et al. | |
| 2008/0046597 A1 | 2/2008 | Stademann et al. | |
| 2008/0065747 A1 | 3/2008 | Kubota | |
| 2008/0159222 A1 | 7/2008 | Akram et al. | |
| 2009/0154406 A1 | 6/2009 | Kim et al. | |
| 2009/0257425 A1 | 10/2009 | Sastry et al. | |
| 2010/0042707 A1 | 2/2010 | Zhao | |
| 2010/0042714 A1 | 2/2010 | Choi et al. | |
| 2010/0191813 A1 | 7/2010 | Gandhewar et al. | |
| 2010/0191839 A1 | 7/2010 | Gandhewar et al. | |
| 2010/0214959 A1 | 8/2010 | Kuehnel et al. | |
| 2010/0218247 A1 | 8/2010 | Nice et al. | |
| 2010/0272107 A1* | 10/2010 | Papp | H04L 29/12028 370/392 |
| 2010/0274924 A1 | 10/2010 | Allan et al. | |
| 2011/0004673 A1 | 1/2011 | Kitamura | |
| 2012/0023207 A1 | 1/2012 | Gandhewar et al. | |
| 2012/0250627 A1* | 10/2012 | McCormack | H04L 61/2046 370/328 |
| 2013/0286854 A1* | 10/2013 | Cao | H04L 41/0645 370/242 |
| 2014/0044134 A1 | 2/2014 | Rajamanickam et al. | |
| 2015/0163192 A1 | 6/2015 | Jain et al. | |
| 2015/0295884 A1 | 10/2015 | Zhao et al. | |
| 2016/0112367 A1 | 4/2016 | Thubert et al. | |
| 2018/0063072 A1 | 3/2018 | Wackerly et al. | |
| 2020/0045011 A1 | 2/2020 | Nayak et al. | |
| 2020/0099654 A1 | 3/2020 | Jose et al. | |

FOREIGN PATENT DOCUMENTS

| | | |
|---|---|---|
| WO | 03/055180 A1 | 7/2003 |
| WO | 03081875 A1 | 10/2003 |
| WO | 2005050897 A2 | 6/2005 |

OTHER PUBLICATIONS

Cheshire, "IPv4 Address Conflict Detection," Network Working Group, Request for Comments: 5227, Jul. 2008, 22 pp.
Habets, "Arping," thomas@habets.pp.se, Jun. 21, 2003, 3 pp.
Habets, "Playing ARP-DRAFT,I repeat: It's a draft," thomas@habets.pp.se, Mar. 30, 2007, 7 pp.
Hinden et al,, "IP Version 6 Addressing Architecture," RFC 4291, IEEE, Network Working Group, Feb. 2006, 25 pp.
Jose et al., "Automatic Recovery From Duplicate Network Addresses," U.S. Appl. No. 16/138,767, filed Sep. 21, 2018.
Moore, "Optimistic Duplicate Address Detection (DAD) for IPv6," Network Working Group, Request for Comments: 4429, Apr. 2006, 17 pp.
Narten et al., "Neighbor Discovery for IP Version 6 (IPv6)," Network Working Group, Request for Comments: 2461, Dec. 1998, 93 pp.
Narten et al., "Neighbor Discovery for IP version 6 (IPv6)," Network Working Group, Request for Comments: 4861, Sep. 2007, 97 pp.
Nayak et al., "Duplicate Address Detection for Global IP Address or Range of Link Local IP Addresses," U.S. Appl. No. 16/234,342, filed Dec. 27, 2018.
Hinden et al., "IP Version 6 Addressing Architecture," Network Working Group, Request for Comments: 4291, Feb. 2006, 26 pp.
"IANA Considerations and IETF Protocol Usage," RFC 5342, IEEE, Network Working Group, Sep. 2008, 22 pp.
Nayak et al., "Faster Duplicate Address Detection for Ranges of Link Local Addresses," U.S. Appl. No. 16/234,320, filed Dec. 27, 2018.
Thomson et al., "IPv6 Stateless Address Autoconfiguration," Network Working Group, Request for Comments: 4862, Sep. 2007, 31 pp.
"Change (Spoof) MAC Address on Windows 2000. XP, 2003, VISTA, 2008, Windows 7," KLC Consulting, Inc., accessed on Oct. 18, 2010, from http://www.klcconsulting.net/Change_MAC_w2k.htm, 8 pp.
"Change Mac Address," File Buzz, accessed on Oct. 18, 2010, from http://www.filebuzz.com/files/Change_Mac_Address/1.html, 4 pp.
"Gentle MAC Pro v4.0," File Buzz, accessed on Oct. 18, 2010, from http://www.filebuzz.com/fileinfo/32000/Gentle_MAC_Pro.html, 2 pp.
"IEEE Standard for Local and Metropolitan Area Networks, IEEE Std 802.1ag™—2007 —Virtual Bridged Local Area Networks—Amendment 5: Connectivity Fault Management," IEEE Computer Society, LAN/MAN Standards Committee, Dec. 7, 2007, 260 pp.
"MacIP Change v1.0," File Buzz, accessed on Oct. 18, 2010, from http://www.filebuzz.com/fileinfo/36702/MacIP_Change.html, 2 pp.
"Subscriber Access Configuration Guide—Release 9.4," JUNOS® Software, Juniper Networks, Inc., Jan. 15, 2009, 38 pp.
Alexander, "DHCP Options and BOOTP Vendor Extensions," RFC 2132, Network Working Group, IETF Standard, Internet Engineering Task Force, Mar. 1997, 35 pp.
Droms et al., "Dynamic Heat Configuration Protocol for IPv6 (DHCPv6)," RFC 3315, Network Working Group, IETF Standard, Internet Engineering Task Force, Jul. 2003, 17 pp.
Droms, "Dynamic Host Configuration Protocol," RFC 2131, Network Working Group, IETF Standard, Internet Engineering Task Force, Mar. 1997, 46 pp.
Droms, R. and R. Cole,"An Inter-server Protocol for DHCP; draft-ietf-dhc-interserver-01.txt" Network Working Group, Internet Draft, Mar. 1997, p. 1-31.
McAuley et al. "Experience with Autoconfiguring a Network with IP Addresses", Proceedings: Communications for Network-Centric Operations: Creating the Information Force, Oct. 28-30, 2001, Mclean, VA, Telcordia Technologies, Inc., 2001, p. 272-276.
Patrick, "DHCP Relay Agent Information Option," RFC 3046, Network Working Group, IETF Standard, Internet Engineering Task Force, Jan. 2001, 15 pp.
U.S. Appl. No. 15/472,832, filed Mar. 29, 2017 by Juniper Networks Inc. (inventor: Thomas et al.) entitled Detecting Hardware Address Conflicts in Computer Networks.
Dong-cheol et al., "Simultaneous multi-DAD (SDAD) in Mobile IPv6," Department of Computer Engineering, Korea University, IEEE, date of conference: Nov. 13-16, 2008, 6 pp.

(56) References Cited

OTHER PUBLICATIONS

Extended Search Report from counterpart European Application No. 19182031.5, dated Jan. 8, 2020, 9 pp.
"VM Server for SPARC 3.5 Administration Guide," Oracle, Nov. 2017, 474pp.
"Arp-scan User Guide," NTA-Wiki, Jun. 28, 2018, 13 pp.
Hinden et al,, "IP Version 6 Addressing Architecture," RFC 2373, IEEE, Network Working Group, Jul. 1998, 24 pp.
Radek Hladik, "linux—Fast ARP scan in address-less DAD (Duplicate Address Discovery) mode—Server Fault," Jul. 27, 2016, 2 pp.
Office Action from U.S. Appl. No. 16/234,320, dated Apr. 29, 2020, 8 pp.
Response to Office Action dated Apr. 29, 2020 from U.S. Appl. No. 16/234,320, filed Jul. 29, 2020, 11 pp.
Wang et al., "Fast Duplicate Address Detection for Seamless Inter-Domain Handoff in All-IPv6 Mobile Networks," Wireless Personal Communications: 42(2), Jul. 2007, pp. 263-275.
Response to Extended Search Report dated Jan. 8, 2020 from counterpart European Application No. 19182031.5, filed Aug. 5, 2020, 13 pp.
Final Office Action from U.S. Appl. No. 16/234,320, dated Oct. 15, 2020, 10 pp.

\* cited by examiner

| Octet | 0 | 1 |
|---|---|---|
| 0 | Hardware address space (HRD) 102 | |
| 2 | Protocol address space (PRO) 104 | |
| 4 | Hardware address length (HLN) 106 | Protocol address length (PLN) 108 |
| 6 | Operation code (OP) 110 | |
| 8 | Sender hardware address (SHA) (first 2 bytes) 112A | |
| 10 | Sender hardware address (SHA) (next 2 bytes) 112B | |
| 12 | Sender hardware address (SHA) (next 2 bytes) 112C | |
| 14 | Sender protocol address (SPA) (first 2 bytes) 114A | |
| 16 | Sender protocol address (SPA) (last 2 bytes) 114B | |
| 18 | Target hardware address (THA) (first 2 bytes) 116A | |
| 20 | Target hardware address (THA) (next 2 bytes) 116B | |
| 22 | Target hardware address (THA) (next 2 bytes) 116C | |
| 24 | Target protocol address (TPA) (first 2 bytes) 118A | |
| 26 | Target protocol address (TPA) (last 2 bytes) 118B | |

FIG. 3

DETECTING HARDWARE ADDRESS CONFLICTS IN COMPUTER NETWORKS

TECHNICAL FIELD

The invention relates to computer networks and, more particularly, hardware addresses for use by network devices within computer networks.

BACKGROUND

A computer network is a collection of interconnected network devices that exchange data and share resources. The network devices may be implemented as physical devices, such as desktop computers, servers, and network appliances, or may be deployed as virtual devices, such as virtual machines executing on virtualization infrastructure. In some networks, such as Ethernet networks, each network interface of the virtual or physical network device is assigned a unique hardware address, such as a Media Access Control (MAC) address. Each network device connected to the network may receive a frame sent on the network, but the network device ignores the frame unless a destination address field of the frame specifies a hardware address matching the hardware address of the network device or unless the destination address field of the frame specifies a hardware address matching a special-purpose broadcast address. A network device sending a frame on the network specifies its own hardware address in a source address field of the frame. Typically, hardware addresses are assigned to network devices at the time the network devices are manufactured. The hardware addresses assigned to the network devices are typically immutable.

Network devices frequently use the Address Resolution Protocol (ARP) to determine the hardware addresses of other network devices connected to a network. In ARP, a requesting network device sends a frame that has a destination address field specifying the broadcast address and that has a payload specifying an address of a higher-layer protocol (i.e., a protocol address), such as an Internet Protocol (IP) address. If another network device on the network is associated with the specified protocol address, the other network device sends a response specifying the hardware address of the other network device. In this way, the requesting network device may build up a mapping of protocol addresses and hardware addresses.

SUMMARY

In general, techniques are described for detecting hardware address conflicts in computer networks. Although hardware addresses, such as Media Access Control (MAC) addresses, assigned during manufacture of network devices are typically unique, there are situations in which duplicate hardware addresses can occur. For example, it may be desirable to assign hardware addresses to virtual machines (VMs) so that the VMs can interact on a network as if they were physical machines that were assigned hardware addresses during manufacture. For example, each of the VMs may represent different Virtual Functions (VFs) having different MAC addresses yet executing on the same underlying host physical machine. However, a system assigning hardware addresses to VMs might assign a hardware address to a VM despite the hardware address already being assigned (e.g., during manufacture) to another network device connected to the network. The existence of two network devices with the same hardware address, such as two locally-administered MAC addresses, on the same network may cause various problems, such as two separate network devices responding to a message intended for only one network device.

This disclosure describes a protocol that may detect the presence of duplicate hardware addresses being present in a network. For instance, in one or more examples, a requesting network device may, with a single request, reserve a plurality of hardware addresses that the requesting network device determined are not duplicate hardware addresses. In this way, when new VMs are spun-up (e.g., instantiated), the requesting network device can assign the new VMs hardware addresses from the reserved plurality of hardware addresses without needing to determine whether the hardware addresses that are to be assigned to the VMs are duplicates.

Determining whether hardware addresses are duplicates each time a new VM is spun-up can be time intensive and negatively impact the amount of time the VMs need to wait before being able to transmit and receive communication. In accordance with one or more examples, a requesting network device determines whether a plurality of hardware addresses is available to be reserved with a single request, thereby reducing the amount of time needed reserve hardware addresses.

For example, a requesting network device may send a frame on a network. The frame may comprise a destination address field and a payload. The destination address field of the frame may specify a broadcast address. The payload may comprise a request message that specifies a range of hardware addresses starting from a target hardware address. A responding network device (i.e., another network device connected to the network) may ignore the request message if a hardware address of the responding network device does not match any hardware address in the range of hardware addresses.

However, in response to determining that at least one hardware address assigned to the responding network device is within the range of hardware addresses including the target hardware address, the responding network device may send a frame on the network. The frame sent by the responding network device may comprise a payload including a response message. The response message specifies a group of hardware addresses within the range of hardware addresses specified by the requesting network device. Based on receiving a response message specifying the group of hardware addresses within the range of hardware addresses, the requesting network device determines that at least a subset of the hardware addresses is available excluding the group of hardware addresses specified by the responding network device. Accordingly, in some examples, the requesting network device may reserve the subset of hardware addresses.

In some examples, the group of hardware addresses specified by the responding network device include all hardware addresses within the range of hardware addresses. In such examples, the requesting network device determines whether there are any duplicates in a range of hardware addresses starting from a different target hardware address, and repeat these example operations until the requesting network device determines hardware addresses that are available.

In the above examples, the requesting network device may be configured to reserve hardware addresses that are not currently reserved by any other network device. However, the example techniques are not so limited. In some examples, in response to receiving a request specifying a range of hardware addresses, a responding network device may determine one or more hardware addresses reserved by the responding network device are within the range of hardware addresses. However, the responding network device may determine that some of the hardware addresses that the responding network device reserved can be released (e.g., because the responding network device determines that all reserved hardware addresses may not be needed). In such examples, the responding network device may transmit a response message identifying which ones of the hardware addresses the responding network device is releasing, and which ones of the hardware addresses the responding network device is having conflict/overlap and responding device is keeping in those reserved hardware addresses. The requesting network device may reserve the released hardware addresses. If the requesting network device determines that additional hardware addresses are needed, the requesting network device may transmit a request message that specifies a range of hardware addresses starting from a different, target hardware address, and repeat these example operations until the requesting network device reserves sufficient hardware addresses.

In one example, this disclosure describes a method for detecting hardware address conflicts in a computer network, the method comprising determining, by a network device of a plurality of network devices in the computer network, a range of hardware addresses starting from a target hardware address, sending, by the network device, a request message on a network, the request message specifying the range of hardware addresses starting from the target hardware address, determining, by the network device, whether the network device received one or more response messages from one or more other network devices of the plurality of network devices specifying one or more hardware addresses within the range of hardware addresses within a time limit, determining, by the network device, based on whether the network device received the one or more response message, whether at least a subset of the hardware addresses within the range of hardware addresses is available, and reserving, by the network device, hardware addresses based on the determination of whether at least the subset of hardware addresses is available.

In another example, this disclosure describes a method for detecting hardware address conflicts in a computer network, the method comprising receiving, by a network device, a request message specifying a range of hardware addresses starting from a target hardware address, determining, by the network device, whether a group of consecutive hardware addresses of the network device match a subset of the range of hardware addresses, and in response to determining that the group of consecutive hardware addresses of the network device match the subset of the range of hardware addresses, sending, by the network device, a response message specifying the group of consecutive hardware addresses.

In another example, this disclosure describes a network device comprising a database and processing circuitry coupled to the database. The processing circuitry is configured to determine a range of hardware addresses starting from a target hardware address, send, a request message on a network, the request message specifying the range of hardware addresses starting from the target hardware address, determine whether the network device received one or more response messages from one or more other network devices of a plurality of network devices coupled to the network specifying one or more hardware addresses within the range of hardware addresses within a time limit, determine based on whether the network device received the one or more response message, whether at least a subset of the hardware addresses within the range of hardware addresses is available, and reserve, in the database, hardware addresses based on the determination of whether at least the subset of hardware addresses is available.

In another example, this disclosure describes a network device comprising a database and processing circuitry coupled to the database. The processing circuitry is configured to receive a request message specifying a range of hardware addresses starting from a target hardware address, determine whether a group of consecutive hardware addresses of the network device match a subset of the range of hardware addresses based on range of addresses stored in the database, and in response to determining that the group of consecutive hardware addresses of the network device match the subset of the range of hardware addresses, send a response message specifying the group of consecutive hardware addresses.

The details of one or more embodiments of the techniques are set forth in the accompanying drawings and the description below. Other features, objects, and advantages of the techniques will be apparent from the description, drawings, and claims.

BRIEF DESCRIPTION OF DRAWINGS

FIG. 3 is a block diagram illustrating an example Address Resolution Protocol (ARP) packet format that may be used for SDMADR, in accordance with one or more techniques of this disclosure.

DETAILED DESCRIPTION

Figure 1:
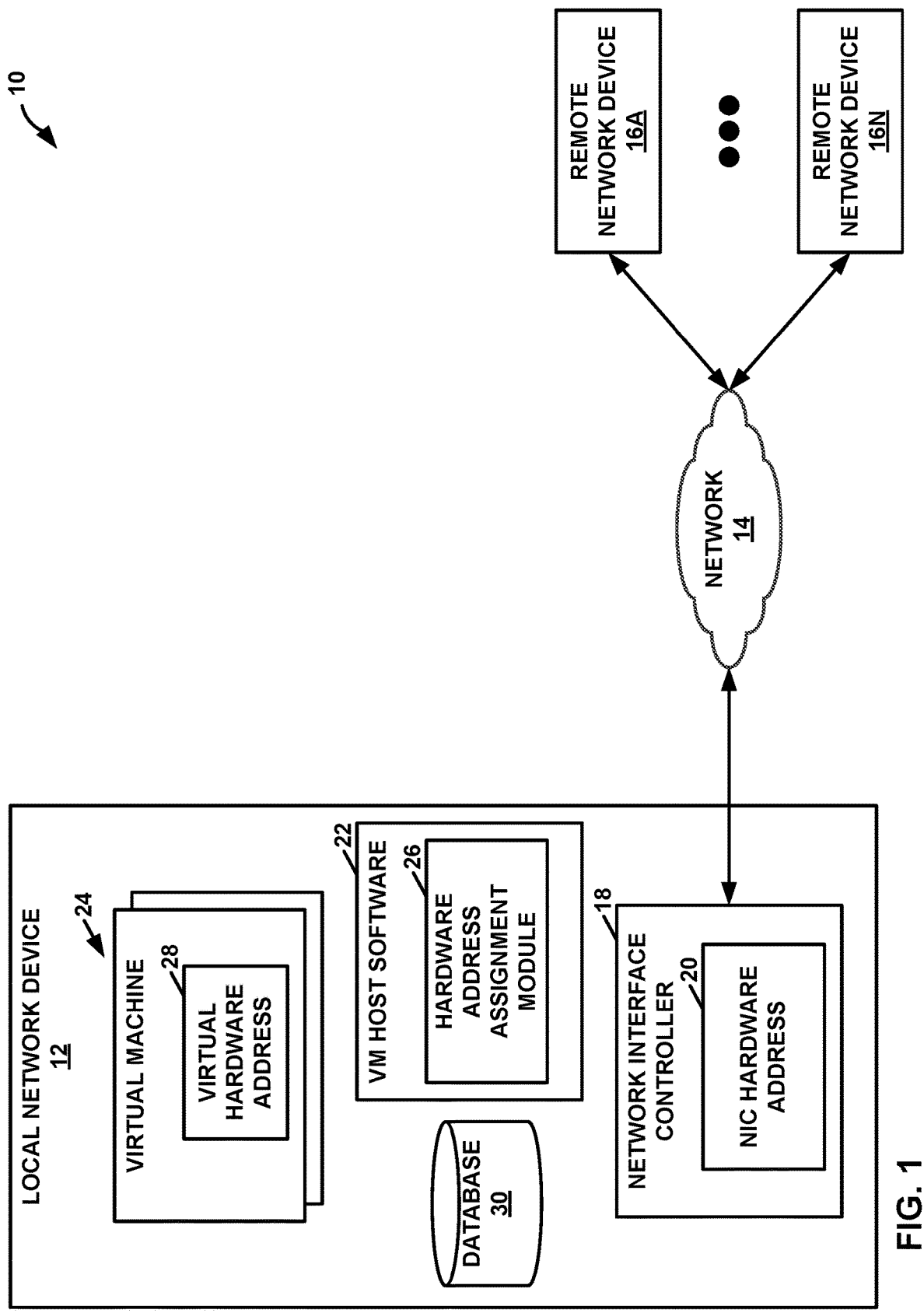
FIG. 1 is a block diagram illustrating an example network system in which a local network device implements hardware address conflict detection techniques of this disclosure.

FIG. 1 is a block diagram illustrating an exemplary network system 10 in which a local network device 12 implements hardware address conflict detection techniques of this disclosure. As shown in FIG. 1, network system 10 comprises local network device 12, a network 14, and remote network devices 16A-16N (collectively, "remote network devices 16"). Local network device 12 is "local" in the context of this disclosure in the sense that this disclosure describes local network device 12 as being an initiating device of the hardware address conflict detection techniques of this disclosure. Likewise, remote network devices 16 are "remote" in the context of this disclosure in the sense that remote network devices 16 are remote from local network device 12. As described in more detail, local network device 12 is an example of a requesting network device, and remote network devices 16 are examples of responding network devices.

Local network device 12 may comprise various types of computing devices. For example, local network device 12 may comprise a server computer, a blade server, a personal computer, a mobile computing device (e.g., a tablet computer, smartphone), an intermediate network device (e.g., a router, gateway, intrusion detection device), or another type of network-equipped computing device. Remote network devices 16 each may comprise similar types of network-equipped computing devices.

Network 14 may comprise various devices and network links that facilitate communication among local network device 12 and remote network devices 16. For instance, network 14 may comprise one or more hubs, repeaters, and/or switches. Network 14 comprises an Ethernet network or other type of network that supports broadcast communication to all network devices connected to network 14 and relies on each device having a unique address. For ease of explanation, this disclosure primarily discusses network 14 as an Ethernet network.

As shown in the example of FIG. 1, local network device 12 comprises a network interface controller (NIC) 18. NIC 18 comprises a computer hardware component that connects local network device 12 to network 14. In some examples, NIC 18 is built into a motherboard of local network device 12. NIC 18 has a NIC hardware address 20, also referred to as a physical hardware address. For instance, physical hardware address 20 may be stored in a memory unit (e.g., a read only memory (ROM) unit, programmable read only memory (PROM), electrically-erasable programmable read only memory (EEPROM)) of NIC 18. NIC hardware address 20 may be a Media Address Control (MAC) address. A manufacturer of NIC 18 may assign hardware address 20 to NIC 18 during manufacture of NIC 18. Typically, the hardware address of a NIC does not change during the life of the NIC, and, in some cases, may be immutable. However, in some examples, NIC hardware address 20 may be changed. In some examples, NIC hardware address 20 may be a hardware address verified by the hardware address non-duplication techniques of this disclosure.

When communicating on network 14, a network device may transmit a message (hereinafter referred to as a "frame") that specifies a source address, a destination address, a payload protocol type field, and a payload. The source address of the frame is the hardware address of the transmitting network device. Sending the source address in the frame may allow a receiving network device to respond by sending a frame back to the initial transmitting device. The destination address of a frame identifies an intended receiver of the frame. The destination address may be a broadcast address (e.g., ff:ff:ff:ff:ff) that indicates that all network devices on the network are the intended receives of the frame. The payload protocol type field of a frame identifies a communication protocol of the payload of the frame. In the context of Ethernet, the payload protocol type field may be referred to as an EtherType field. For example, a payload protocol type field may indicate the payload is formatted in an Address Resolution Protocol (ARP), an Internet Protocol (IP), IPSec protocol, or another type of communication protocol.

Furthermore, as shown in the example of FIG. 1, local network device 12 may comprise virtual machine (VM) host software 22. VM host software 22 may comprise various types of software systems that host VMs 24. For example, VM host software 22 may comprise an operating system. In another example, VM host software 22 may comprise a hypervisor.

In this disclosure, VM host software 22 and a hardware address assignment module (HAAM) 26 of VM host software 22 may execute on processing circuitry of local network device 12, and may configure the processing circuitry to perform the example techniques described in this disclosure. For example, memory of local network device 12 may store computer-readable instructions for VM host software 22 and HAAM 26 that the processing circuitry retrieves and executes. Execution of the instructions then configures the processing circuitry to perform the example operations described in this disclosure. In some examples, the processing circuitry may be a combination of fixed-function circuitry (e.g., having immutable operations) and programmable circuitry. For example, the processing circuitry may include one or more processors, and the processors will include programmable cores and fixed-function circuitry as one example.

In general, each of VMs 24 is an emulation of a respective computer system. Since each of VMs 24 emulates a respective computer system, each of VMs 24 should have a respective hardware address for use in communicating on network 14. Accordingly, HAAM 26 may assign a respective virtual hardware address 28 to each respective VM 24. Subsequently, when NIC 18 receives a frame specifying a virtual hardware address of a VM as the destination address, VM host software 22 accepts the frame and forwards the frame to the VM. When a VM generates a frame for transmission on network 14, the frame specifies the virtual hardware address of the VM as the source address of the frame. VM host software 22 then passes the frame to NIC 18 for transmission on network 14.

Hardware addresses assigned during manufacture of NICs are typically unique (at least regionally) because such hardware addresses typically include a prefix corresponding the manufacturer and the manufacturer does not reuse hardware addresses for its own products. However, there may be no such assurance for virtual hardware addresses 28. In other words, there may be no guarantee that two network devices, when considering VMs 24 as distinct network devices, do not have the same hardware address. For example, HAAM 26 may assign virtual hardware addresses 28 such that each of virtual hardware addresses is different, but it might so happen that one of remote network devices 16 has a hardware address that matches one of virtual hardware addresses 28 assigned to VMs 24. Having two network devices on the same network with the same hardware address may cause significant problems. For example, two network devices may respond to the same frame, resulting in confusing errors.

This disclosure describes techniques that may overcome certain problems associated with the possibility of assignment of virtual hardware addresses. Particularly, this disclosure describes techniques for determining whether there are multiple network devices on a network claiming the same hardware address.

Furthermore, the examples of the techniques described in this disclosure may reserve a plurality of virtual hardware addresses that are determined to not be duplicates with any other hardware address reserved by a network device or assigned to a VM by a network device. For instance, VM host software 22 may spin-up (e.g., instantiate) one or more VMs 24 are various instances based on communication needs. If VM host software 22, via HAAM 26, had to determine whether a hardware address that HAAM 26 is to assign a VM 24 is duplicative every time a new VM 24 is spun-up, there may be substantial delays in assigning hardware addresses to VMs 24, which delays when VMs 24 can communicate.

As one example, assume VM host software 22 is to instantiate three VMs 24. In some techniques, HAAM 26 would select a hardware address for each of the three VMs 24, and one-by-one determine whether the three selected hardware addresses are unique or have duplicates. In these techniques, under a best-case scenario where the selected hardware addresses for the three VMs 24 are not duplicative, it may take HAAM 26 three seconds, per VM 24, to confirm that the selected hardware addresses are not duplicative. In such examples, HAAM 26 takes nine seconds (e.g., three seconds per VM 24) to assign hardware addresses to the three VMs 24. It would take HAAM 26 longer than nine seconds if even one of the selected hardware addresses were determined to be duplicative.

In one or more examples, HAAM 26 determines a plurality of hardware addresses that are not duplicative with minimal number of requests (e.g., as little as one request), rather than determining hardware addresses that are not duplicative one-by-one. HAAM 26 reserves the hardware addresses determined to not be duplicative, and HAAM 26 assigns VMs 24 that are newly spun-up from the reserved hardware addresses. This way, HAAM 26 may not need to determine whether hardware addresses are duplicative or not every time a VM 24 is to spin-up. For instance, in the above example, in some techniques, it may take HAAM 26 up to nine seconds to determine hardware addresses for three VMs 24. However, in techniques described in this disclosure, HAAM 26 may be able to assign hardware addresses to the three VMs 24 immediately.

In one example, HAAM 26 may run a Sequence of Duplicate MAC Addresses Detection and Reservation (SD-MADR) protocol. SDMADR protocol is an extension of ARP protocol. SDMADR defines a new hardware address space/Hardware type (HTYPE) so that existing ARP implementations and those that do not support this ARP extension still continue to function as usual by dropping the packet. A new value "SDMADR-over-Ethernet" is defined for hardware address space for identifying the packet that the packet belongs to SDMADR.

In a first step, HAAM 26 generates a request message specifying NIC hardware address 20. As mentioned elsewhere in this disclosure, NIC hardware address 20 may be assigned to NIC 18 of local network device 12 at a time of manufacture of NIC 18. HAAM 26 also includes a target hardware address and a range of target hardware addresses. The target hardware address may be a hardware address that HAAM 26 plans to reserve for assigning to one of VMs 24, and the range of hardware addresses may be N number of consecutive hardware addresses, where N is a number greater than or equal to 1. The target hardware address may be the starting hardware address of the range of hardware addresses. As one example, the target hardware address is 0, and the range is 64, meaning that HAAM 26 plans to reserve hardware address 0 to 63.

As another example, HAAM 26 specifies the starting and ending hardware addresses (e.g., hardware address 10 to 19). This example is another way in which HAAM 26 specifies a range of hardware addresses starting from a target hardware address. For instance, in this example, the target hardware address is 10 and the range is 10. There may be other ways in which to specify a range of hardware addresses staring from a target hardware address, and the example techniques are not limited to the specific examples provided above.

There may be various ways in which HAAM 26 determines the target hardware address and the range of hardware addresses. As one example, HAAM 26 determines the target hardware address using a random number generator for the last two bytes, and the first six bytes are based on manufacturer of NIC 20 or based on pre-configuration of VM host software 22. HAAM 26 may be pre-configured with a value of N that defines the consecutive hardware addresses HAAM 26 should reserve (e.g., N is pre-configured as 64 or 256). As another example, VM host software 22 may track a rate of how many VMs 24 are being spun-up and how many VMs 24 are being brought down, and HAAM 26 may determine the value of N based on the tracked rate. If on average, based on the tracked rate, X number of VMs 24 are executing on local network device 12, then HAAM 26 may determine a value of N that is greater than or equal to X. There may be other ways in which to determine the range of the hardware addresses, and the example techniques are not limited to the above examples.

For instance, physical configuration of local network device 12 allows creation of a certain number of VMs 24 with specified number of Virtual network interface controller for each VM 24. These configurations are based on the number of physical Network interface controllers 18 and capacity of each physical network interface controller 18 in terms of bandwidth.

A Network Administrator of local network device 12 may determine how many VMs 24 need to be created with certain number of virtual network interface controller for each VM 24 to achieve successful operation of VMs 24 for a pre-defined load.

For example, local network device 12 has two physical network interface controllers 18 and each physical Network interface controller 18 capacity is 8 Gbs (Giba-bits per second). So total network capacity available with local network device 12 is 16 Gbs. If each of the VMs 24 is expected to own 2 Gbs network capacity to execute a predefined operation then 8 VMs 24 can be created out of a single local network device 12. Each of these 8 VMs 24 can have one Virtual network interface controller. Therefore, total number of virtual interface controller is 8. In this example, suppose number of virtual network interface controller decided for a local network device 12 is X. Then X number of hardware addresses need to be reserved by HAAM 26. However actual VMs 24 in operation at certain point of time may be less than the total number of VMs 24 created on local network device 12. These VMs 24 use less number of Virtual network interface controller, which is less than X.

HAAM 26 then instructs NIC 18 to send, on network 14, a frame comprising the request message and having a destination address field specifying a broadcast address. Thus, each network device connected to network 14 (e.g., remote network devices 16, already configured VMs 24) may receive and accept the frame. In some examples, a source hardware address field of the frame may specify a unicast hardware address reserved from the Internet Assigned Numbers Authority (IANA) for use with SDMADR).

In response to receiving the frame, a network device determines whether a hardware address or group of consecutive hardware addresses of the network device matches hardware addresses in the range of hardware addresses. As an example, remote network device 16A may have reserved hardware addresses for assigning to the VMs that execute on remote network device 16A. In this example, the HAAM of remote network device 16A may determine whether any of the hardware addresses reserved for VMs that execute on remote network device 16A are within the range of hardware addresses specified by HAAM 26. For instance, the HAAM of remote network device 16A may determine whether a group of consecutive hardware addresses, which are part of the hardware addresses reserved by remote network device 16A, are within the range of hardware addresses specified by local network device 12.

In response to determining that remote network device 16A reserved a group of hardware addresses within the range of addresses specified in the request message, remote network device 16A generates a response message. In one example, the response message specifies a range of hardware addresses starting from a response hardware address that are reserved by remote network device 16A. The range of hardware addresses starting from the response hardware address partially or fully overlap the range of hardware addresses starting from the target hardware address specified by local network device 12.

As an example, local network device 12 may specify the target hardware address as 10 and the range of hardware addresses as 10 (e.g., local network device 12 is reserving addresses 10 to 19). Remote network device 16A may determine that remote network device 16A had previously reserved hardware addresses 5 to 24. In this example, remote network device 16A determines that the hardware addresses reserved by remote network hardware device 16A partially or fully (fully, in this example) overlap the hardware address range of 10 to 19, requested to be reserved by local network device 12. In this example, remote network device 16A generates a response message indicating that remote network device 16A reserved hardware addresses 5 to 24.

In some examples, although remote network device 16A reserved hardware addresses that fully or partially overlap the range of hardware addresses starting from the target hardware address requested by local network device 12, remote network device 16A may determine that some of the overlapping hardware addresses can be released for use by local network device 12. For instance, keeping with the previous example, remote network device 16A may determine that remote network device 16A can release hardware addresses 10 to 14, so that remote network device 16A would still reserve hardware addresses 5-9 and 15-24, but 10-14 would be available for local network device 12. In this example, remote network device 16A generates a response message indicating that remote network device 16A is releasing hardware addresses 10-14 and keeping in reserve hardware addresses 5-9 and 15-24.

Local network device 12 may utilize various factors to determine which ones and how many reserved addresses can be released. Assume that HAAM 26 reserved X number of addresses. As one example, VM host software 22 may track a rate of how many VMs 24 are being spun-up and how many VMs 24 are being brought down, and HAAM 26 may determine the value of N based on the tracked rate. If on average, based on the tracked rate, N number of VMs 24 are executing on local network device 12, then (X-N) of hardware address can be released by HAAM 26.

For example, X is max number of VMs 24 designed for local network device 12, and X number of hardware addresses are reserved by HAAM 26. However actual VMs 24 in operation at certain point of time is less than the total number of VMs 24 created on local network device 12. So these VMs 24 uses less number of Virtual network interface controller than X. Accordingly, HAAM 26 may release (X-N) hardware addresses.

Remote network device 16A then sends, on network 14, a frame comprising the response message. In some examples, a destination hardware address of the frame specifies the broadcast address. In some examples, the destination hardware address of the frame specifies the NIC hardware address of remote network device 16A specified in the request message (i.e., NIC hardware address 20). In some examples, a source hardware address field of the frame may specify a unicast hardware address reserved from the IANA for use with SDMADR). On the other hand, in response to determining that none of the hardware addresses reserved by remote network device 16A are within the range of hardware addresses specified by local network device 12, remote network device 16A does not generate a response message.

If HAAM 26 does not receive a response message specifying a range of hardware addresses that partially or fully overlap the range of hardware addresses starting with the target hardware address specified by HAAM 26, HAAM 26 may determine that all hardware addresses within the range of hardware addresses starting with the target hardware address are available (e.g., not duplicative). HAAM 26 may then reserve all hardware addresses within the range of hardware addresses starting with the target hardware address (e.g., store information indicating the reserved hardware addresses in database 30).

If HAAM 26 receives one or more response messages that together specify that all addresses specified by HAAM 26 are reserved by other network devices, HAAM 26 may select a new, different target hardware device, and perform the examples of the above procedure with the new target hardware device. For instance, assume HAAM 26 specified 64 hardware addresses. It is possible that remote network device 16A had reserved 10 hardware addresses that overlap the 64 hardware addresses specified by HAAM 26, and remote network device 16A may have send a response message indicating the 10 hardware addresses. Remote network device 16B may have reserved 54 hardware addresses that overlap the 64 hardware addresses specified by HAAM 26, and remote network device 16B may have send a response message indicating the 54 hardware addresses. It is also possible that either one of remote network device 16A or 16B had reserved all of the 64 hardware addresses specified by local network device 12. In either example, local network device 12 may determine that none of the 64 hardware addresses local network device 12 specified are available. Local network device 12 may start with a new, different target hardware address and repeat the above example procedures.

In some examples, HAAM 26 receives one or more response messages that specify a group of hardware addresses that overlap with the range of hardware addresses specified by local network device 12. For instance, remote network device 16A may send a response message indicating that 10 hardware addresses overlap the 64 hardware addresses specified by local network device 12, and remote network device 16B may not send any response. In this example, local network device 12 may reserve the 54 non-overlapping hardware addresses (e.g., a subset of the hardware addresses specified by local network device 12). HAAM 26 may determine whether additional hardware addresses are needed, and if needed, repeat the above procedure starting from a new target hardware address.

In some examples, HAAM 26 receives one or more response message that specify a group of hardware addresses that overlap with the range of hardware addresses specified by local network device 12, but further specify a group of hardware addresses being released by the responding network device. For example, remote network device 16A may release some of the hardware addresses that remote network device 16A has reserved that are within the range of hardware addresses specified by local network device 12. Local network device 12 may reserve those hardware addresses released by remote network device 16A.

Although the above examples are described with respect to remote network device 16A, the other network devices on network system 10 operate similarly. For instance, remote network device 16B operates similar to remote network device 16A. Also, the techniques are described with respect to local network device 12. However, the techniques described in this disclosure may be performed by any and all of the network devices of network system 10. For instance, from perspective of remote network device 16A, remote network device 16A is a local network device, and local network device 12 is a remote network device.

Thus, in the example of FIG. 1, a network device (e.g., local network device 12) may determine a range of hardware addresses starting from a first target hardware address (e.g., a MAC address). Additionally, the network device may send a first request message on network 14, the first request message specifying the range of hardware addresses starting from the target hardware address. The network device may determine whether the network device has received one or more response messages from one or more other network devices (e.g., remote network devices 16A or 16B) of the plurality of network devices specifying one or more hardware addresses within the range of hardware addresses within a time limit. The network device may determine, based on whether the network device received the one or more response message, whether at least a subset of the hardware addresses within the range of hardware addresses is available, and reserve hardware addresses based on the determination of whether at least the subset of hardware addresses is available. The network device may execute one or more VMs 24, and assign one or more of the reserved hardware addresses to each of the one or more VMs.

Furthermore, in the example of FIG. 1, a network device (e.g., local network device 12, one of remote network devices 16) may receive a request message specifying a range of hardware addresses starting from a target hardware address. The network device may determine whether a group of consecutive hardware addresses of the network device match a subset of the range of hardware addresses. In response to determining that the group of consecutive hardware addresses of the network device match the subset of the range of hardware addresses, the network device may send a response message specifying the group of consecutive hardware addresses.

In the example of FIG. 1, local network device 12 may comprise a database 30. Database 30 may store indicating hardware address of network devices connected to network 14. VM host software 24 (e.g., HAAM 26) may add entries to database 30 specifying hardware addresses in response to receiving response messages specifying the hardware addresses, in response to successfully reserving hardware addresses for VMs 24, or in response to other events. Furthermore, in some examples, a response message may comprise a device identifier. The device identifier may comprise a character string the identifies a network device sending the response. Entries in database 30 may map such device identifiers to hardware addresses.

Figure 2:
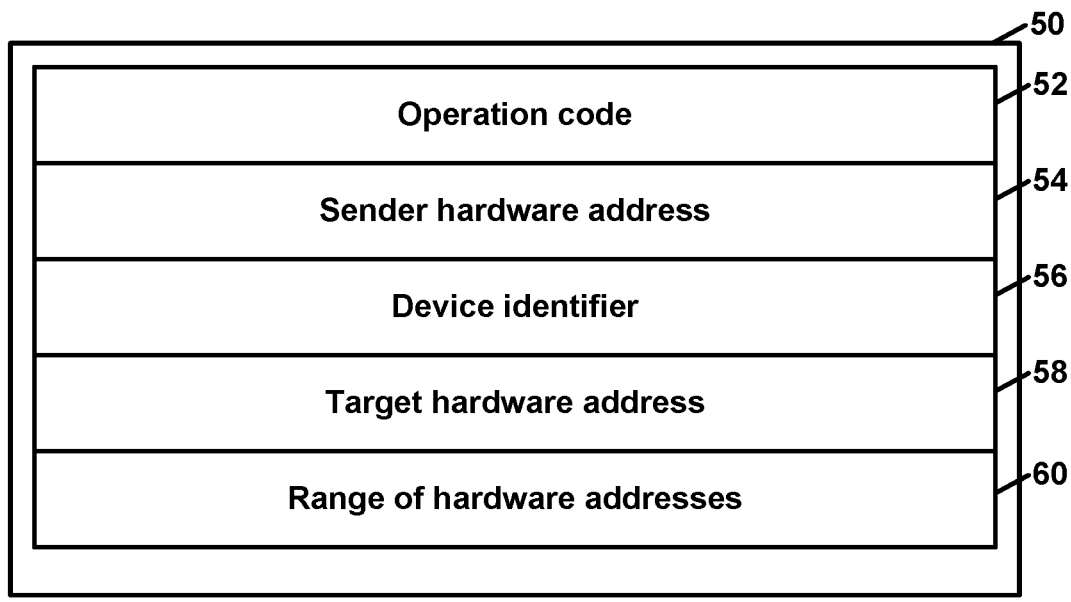
FIG. 2 is a block diagram illustrating an example Sequence of Duplicate MAC Address Detection and Reservation (SDMADR) packet format, in accordance with one or more techniques of this disclosure.

FIG. 2 is a block diagram illustrating an example Sequence of Duplicate MAC Address Detection and Reservation (SDMADR) packet format, in accordance with one or more techniques of this disclosure. In the example of FIG. 2, request messages and response messages may have the same format. Thus, in the example of FIG. 2, a message 50 may comprise an operation code field 52, a sender hardware address field 54, a device identifier field 56, a target hardware address field 58, and a range of hardware address field 60.

Operation code field 52 specifies an operation code. The operation code specifies whether message 50 is a SDMADR request or a SDMADR response. For example, a first value of the operation code specifies that message 50 is a SDMADR request and a second, different value of the operation code specifies the message 50 is a SDMADR response.

In a SDMADR request, sender hardware address field 54 specifies a NIC hardware address (e.g., NIC hardware address 20 (FIG. 1)) of a network device sending the SDMADR request (e.g., local network device 12). Device identifier field 56 may specify a device identifier of a network device sending message 50. In some examples, device identifier field 56 is omitted from message 50. The device identifier may be an opaque string that people or devices can use to identify the network device sending the message 50. For example, the device identifier may specify a string such as "RACK 01 BLADE 12". Target hardware address field 58 may specify a target hardware address. In the case where message 50 is a SDMADR request, target hardware address field 58 may specify a hardware address that is the starting of a plurality of hardware addresses that a requesting network device is specifying to reserve as part of the SDMADR request message.

In the case where message 50 is a SDMADR response, sender hardware address field 54 may specify a hardware address that is the starting of a plurality of hardware addresses that a responding network device is specifying to have already reserved and may like to inform requesting network device about this overlapped hardware addresses. In the case where message 50 is a SDMADR response, target hardware address field 58 may specify a hardware address that is the starting of a plurality of hardware addresses that a responding network device is specifying to release as part of the SDMADR response message.

Range of hardware addresses field 60 may specify the number of consecutive hardware addresses starting from the target hardware address field 58 that a requesting network device is specifying to reserve as part of the SDMADR request message. As an example, if requesting network device requests to reserve hardware addresses 10-18, then target hardware address field 58 has value 10 and range of hardware addresses field 60 has value 9 for SDMADR request message.

In a SDMADR response message, range of hardware addresses field 60 may specify one group of consecutive hardware addresses reserved by the responding network device and may specify the other group of consecutive hardware addresses released by the responding network device. The two group of consecutive hardware addresses specified in range of hardware addresses field 60 in a SDMADR response partially or fully overlap the range of hardware addresses starting from the target hardware address specified by the SDMADR request message.

For example, assume the requesting network device request to reserve hardware addresses 10-18, and responding network device has already reserved hardware addresses 10-18 but responding device can release hardware addresses 15-18. In this example, in a SDMADR response message, sender hardware address field 54 has value 10 and target hardware address field 58 has value 15. One range of hardware addresses field 60 has value 5 to indicate non-released/reserved range of hardware addresses (e.g., 10-14 are reserved). The other range of hardware addresses field 60 has value 4 to indicate about released range of hardware addresses (e.g., 15-18 are released).

FIG. 3 is a block diagram illustrating an example Address Resolution Protocol (ARP) packet format that may be used for SDMADR, in accordance with one or more techniques of this disclosure. ARP is a commonly-implemented protocol for resolving MAC addresses based on known protocol addresses (e.g., IP addresses). In accordance with a technique of this disclosure, modules implementing ARP (e.g., hardware and/or software implementing ARP) may be modified to perform SDMADR using packets structured according to ARP.

Thus, request messages and response messages may conform to an ARP format. Furthermore, a network device (e.g., local network device 12 or one of remote network devices 16A or 16B) may send or receive a frame (e.g., an Ethernet frame) that comprises a request message or a response message, the frame having a payload protocol field (e.g., EtherType field) specifying a value corresponding to ARP.

As shown in FIG. 3, an ARP packet 100 comprises a hardware address space field 102 (abbreviated "HRD"), a protocol address space field 104 (abbreviated "PRO"), a hardware address length field 106 (abbreviated "HLN"), a protocol address length field 108 (abbreviated "PLN"), an operation code field 110 (abbreviated "OP"), up to three 2-byte fields 112A-112C comprising a sender hardware address field 112 (abbreviated "SHA"), up to two 2-byte fields 114A-114B comprising a sender protocol address field 114 (abbreviated "SPA"), up to three 2-byte fields 116A-116C comprising a target hardware address field 116 (abbreviated "THA"), and up to two 2-byte fields 118A-118B comprising a target protocol address field 118 (abbreviated "TPA"). Target address space field 102 may also be referred to as a hardware type (HTYPE) field. Protocol address space field 104 may also be referred to as a protocol type (PTYPE) field.

In accordance with a technique of this disclosure, a new value (e.g., "SDMADR-over-Ethernet") may be defined for hardware address space field 102 identifying ARP packet 100 as belonging to SDMADR. The semantics of protocol address space field 104, hardware address length field 106, and protocol address length field 108 may be the same as in ARP. For instance, protocol address space field 104 may specify a protocol for which the ARP request is intended. For instance, the value 0x0800 may specify IPv4. Allowable values of protocol address space 104 may share a numbering space with those for EtherType. Hardware address length field 106 specifies a length in octets of a hardware address. Ethernet addresses (e.g., MAC addresses) have a length of 6 octets. Protocol address length field 108 specifies a length in octets of addresses used in the upper layer protocol specified by protocol address space field 104.

In accordance with a technique of this disclosure, new values of operation code field 110 (also called ar$op field 110) may be defined to indicate a SDMADR request (multi-mac-verify-req) and a SDMADR response (multi-mac-verify-resp). Furthermore, sender hardware address field 112 (also called ar$sha field 112) specifies a hardware address of a sender of ARP packet 100. For instance, if ARP packet 100 is a SDMADR request, sender hardware address field 112 may specify the NIC hardware address (e.g., NIC hardware address 20 (FIG. 1)) of the sending network device (e.g., local network device 12 (FIG. 1)). If ARP packet 100 is a SDMADR response, sender hardware address field 112 may specify the hardware address of the sending network device (e.g., one of remote network devices 16 (FIG. 1)).

Furthermore, sender protocol address field 114 (also called ar$spa 114) may specify a device identifier of a network device sending ARP packet 100. As indicated above, the device identifier of the network device may comprise an opaque string that can be used to identify the network device.

Target hardware address field 116 (also called ar$tha field 116) specifies a target hardware address. The target hardware address may be the same as the sender hardware address field 112 (e.g., ar$tha is same as ar$sha) or different. If ARP packet 100 is a SDMADR request, the target hardware address may be a hardware address for which a network device sending the SDMADR request is determining availability, and is the start of the range of hardware addresses for which the network device sending the SDMADR request is determining availability. In rare circumstances, multiple network devices may have the same NIC hardware address. Furthermore, a network device with a particular hardware address may join a network (e.g., network 14 (FIG. 1) after that particular hardware address has already been successfully assigned as a virtual hardware address to a VM (e.g., one of VMs 24 (FIG. 1)) on the network. Hence, to avoid problems associated with having multiple devices on a network having the same hardware address, a network device may send a SDMADR request specifying its NIC hardware address in both sender hardware address field 112 and target hardware address field 116 or may select a different target hardware address field 116 that is different than hardware address field 112.

In a SDMADR response, the sender hardware address field 112 may be repurposed to be the starting hardware address of a range of addresses that are already reserved by the responding network device. In a SDMADR response, the target hardware address field 116 may be repurposed to be starting hardware address of a range of addresses those are released by the responding network device.

SDMADR's multi-mac-verify-resp packet fields are interpreted as follows. ar$sha is the target hardware address that is ar$tha from multi-mac-verify-req packet. ar$spa is defined as a opaque string that can be used the identify the device. ar$tha is the starting hardware address of a range addresses those are released. ar$tpa is 4 bytes. 2 bytes is used to store a first range number for reserved hardware addresses. This number indicates a range of hardware addresses starting from target hardware addresses and those are reserved by responding device. 2 bytes is used to store range number for hardware addresses that can be released. This number indicates a range of hardware addresses starting from released hardware address and those are released by responding device.

In this disclosure, multi-mac-verify-resp mentions a range of reserved hardware address starting from target hardware addresses. Also, multi-mac-verify-resp mentions a range of released hardware address starting from released hardware address. However, these addresses are released for reservation by the requesting network device receiving multi-mac-verify-resp.

As one example, assume that the requesting device requested addresses 120-249, and responding device had previously reserved addresses 100-199. In one example, the responding device is configured to indicate to the requesting device that the responding device has addresses 100-199 and wants to reserve them all. In this example, ar$sha is 100 as it is starting address of reserved address of responding device, and ar$tha is zero as no hardware address is released by responding device. Also, $tpa has 4 bytes, first two bytes indicates about reserved address range 100-199, so the value is 100. Second two bytes is zero as it indicates about released address range and no hardware address is released by responding device.

In another example, the responding device is configured to indicate to the requesting device that the responding device has addresses 100-199 and all are to be released. In this example, ar$sha is zero as responding device has no reserved hardware address after releasing all of them. Also, ar$tha is 100 as it is the starting hardware address released by responding device. In this example, ar$tpa has 4 bytes, first two bytes value is zero as no reserved hardware address after releasing all of them. Second two bytes value is 100 as 100 hardware addresses are released by responding device.

In another example, the responding device is configured to indicate to the requesting device that the responding device has addresses 100-199 and wants to release addresses 150-199. In this example, ar$sha is 100 as responding device has reserved hardware address starting 100. Also, ar$tha is 150 as it is the starting hardware address released by responding device. In this example, ar$tpa has 4 bytes, first two bytes value is 50 as last reserved hardware address after releasing is 149. So reserved address range is 100-149. Second two bytes value is 50 as 50 hardware addresses are released by responding device and released address range is 150-199.

In another example, the responding device is configured to indicate to the requesting device that the responding device has addresses 100-199 and wants to release addresses 120-129. In this example, ar$sha is 100 as responding device has reserved hardware address starting 100. Also, ar$tha is 120 as it is the starting hardware address released by responding device. In this example, ar$tpa has 4 bytes, first two bytes value is 100 as last reserved hardware address after releasing is 199. So reserved address range is 100-199. However, it overlaps with released address range 120-129. Second two bytes value is 10 as 10 hardware addresses are released by responding device. Released address range tells to exclude those range of addresses from reserved address range.

In a SDMADR request, target protocol address field 118 (also called ar$tpa field 118) may specify a range of hardware addresses starting from the hardware address specified in the target hardware address field 116. In a SDMADR response, target protocol address field 118 may use two byes of the four bytes to store range of hardware addresses from target hardware address, those are reserved by responding device and two byes to store range of hardware addresses from released hardware address, those are released by responding device. Accordingly, the SDMADR response may include a range of reserved hardware addresses starting from a target hardware address. The SDMADR response may also include a range of released hardware addresses starting from a released hardware address. These released hardware addresses are released by the responding network device and further usage by requesting device that received the SDMADR request message.

Thus, a SDMADR request message may comprise a 16-bit hardware address space field, a 16-bit protocol address space field, an 8-bit hardware address length field, an 8-bit protocol address length field, a 16-bit operation code field, a n-bit sender hardware address field, a m-bit sender protocol address field, a n-bit target hardware address field, and a m-bit target protocol address field. In this example, n is defined by the hardware address length field and m is defined by the protocol address length field. The operation code field may specify a value indicating that the request message is a SDMADR request message and the source hardware address field may specify a NIC hardware address of the network device. The NIC hardware address may be assigned to a NIC of the network device at a time of manufacture of the NIC. The source protocol address field may specify a device identifier of the network device and the target hardware address field may specify the target hardware address. The target protocol address field may specify a range of hardware addresses starting from the target hardware address.

Similarly, a SDMADR response message may comprise a 16-bit hardware address space field, a 16-bit protocol address space field, an 8-bit hardware address length field, an 8-bit protocol address length field, a 16-bit operation code field, a n-bit sender hardware address field, a m-bit sender protocol address field, a n-bit target hardware address field, and a m-bit target protocol address field, where n is defined by the hardware address length field and m is defined by the protocol address length field. In the SDMADR response, sender hardware address field may indicate the start of the consecutive hardware addresses reserved by the responding network device, and the target hardware address may indicate the start of the consecutive hardware addresses being released by the responding network device. The target protocol address field includes four bytes. The first two bytes may be reserved to indicate the number of hardware addresses, starting from the address identified in sender hardware address field, that are reserved by the responding network device, and the second two byte may be reserved to indicate the number of hardware addresses, starting from the addresses identified in the target hardware address field, that are released by the responding device.

FIGS. 4A-4D are conceptual diagrams illustrating examples of communications between a requesting network device and a responding network device to reserve MAC addresses by the requesting network device. For example, FIGS. 4A-4D illustrate different example cases of communications between a requesting network device 120 and a responding network device 122. Although a single responding network device 122 is illustrated, there may be multiple responding network devices, each specifying different ranges of overlapping hardware addresses or not providing a response.

Figure 4A:
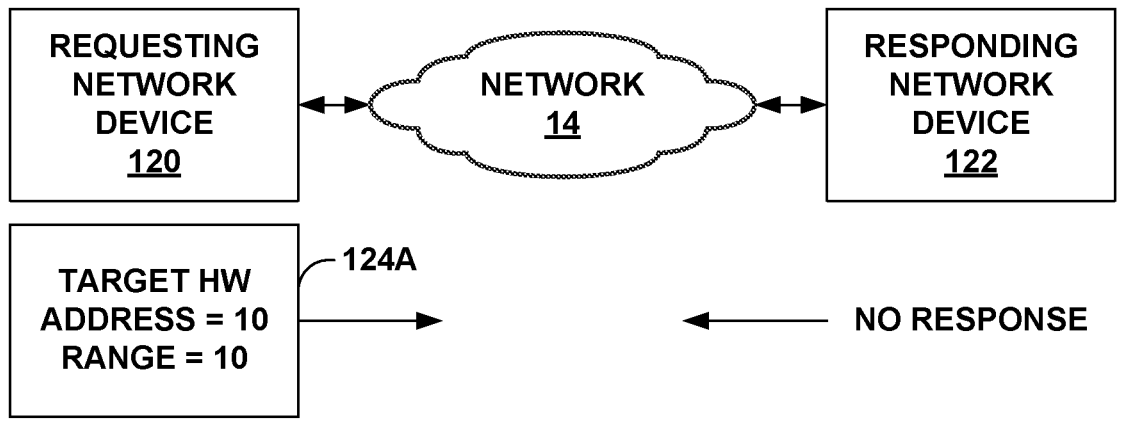
FIGS. 4A-4D are conceptual diagrams illustrating examples of communications between a requesting network device and a responding network device to reserve MAC addresses by the requesting network device.

In FIG. 4A, requesting network device 120 generates ARP packet 124A as a SDMADR request. In this example, the SDMADR request specifies the target hardware address as 10 (e.g., ar$tha is 10), and the range of hardware addresses as 10 (e.g., ar$tpa is 10). In other words, in this example, requesting network device 120 is requesting to reserve hardware addresses 10-19. In FIG. 4A, within a certain time limit (e.g., 3 seconds), requesting network device 120 did not receive any ARP packet having an SDMADR response. In this example, requesting network device 120 may reserve hardware addresses 10-19 for assigning the VMs that instantiate on requesting network device 120.

In the example of FIG. 4A, requesting network device 120 determined that requesting network device 120 did not receive any message from any of the other network devices specifying any of the hardware addresses within the range of hardware addresses specified by requesting network device 120 within the time limit. Therefore, requesting network device 120 determined that all hardware addresses within the range of hardware addresses starting from the target hardware address are available, and reserved all hardware addresses within the range of hardware addresses starting from the target hardware address.

Figure 4B:
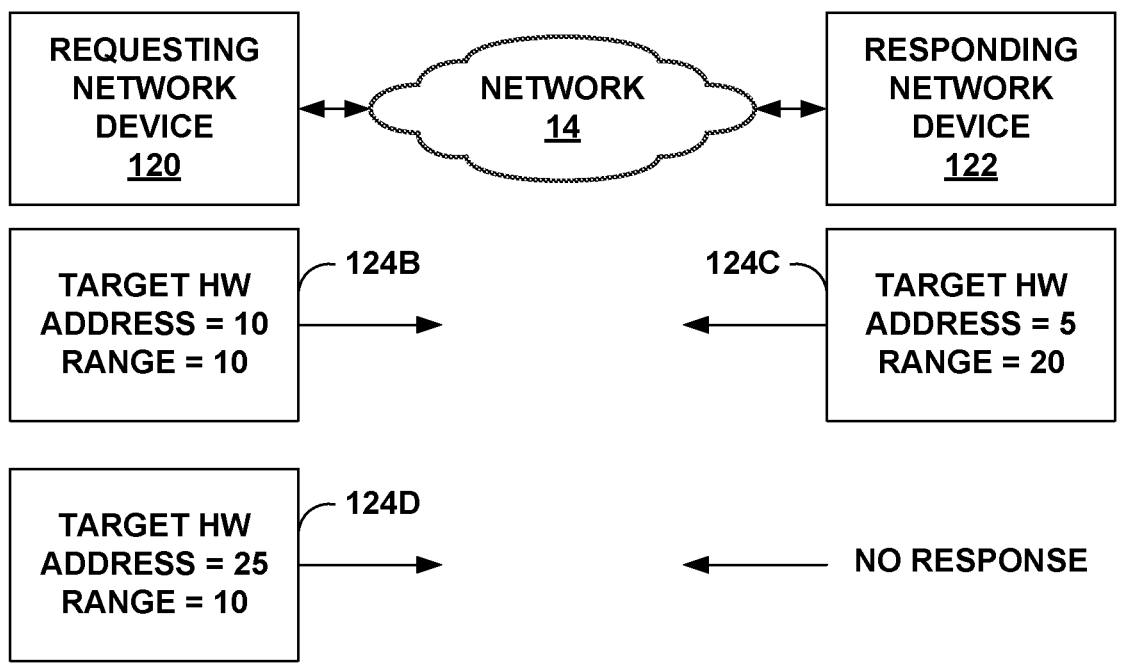

In FIG. 4B, requesting network device 120 generates ARP packet 124B, which is a SDMADR request, similar to ARP packet 124A. In FIG. 4B, within a certain time limit, requesting network device 120 receives ARP packet 124C, which is an SDMADR response. The SDMADR response of ARP packet 124C specifies that responding network device 122 has reserved hardware addresses starting from a target hardware address 5 with a range of 20. In other words, in this example, responding network device 122 has reserved hardware addresses 5-24.

Based on the SDMADR response message of ARP packet 124C, requesting network device 120 may determine that none of the hardware addresses specified in the SDMADR request message of ARP packet 124B are available. For instance, responding network device 122 has reserved addresses 5-24, but requesting network device 120 is requesting addresses 10-19, and addresses 5-24 fully overlap addresses 10-19.

Because requesting network device 120 determined that none of the hardware addresses specified in the SDMADR request message of ARP packet 124B are available, requesting network device 120 may generate a second SDMADR request message in ARP packet 124D. As illustrated in FIG. 4B, the target hardware address of the second SDMADR request message is 25, which requesting network device 120 determined is not reserved by responding network device 122 based on the SDMADR response message of ARP packet 124C. The range of hardware addresses in the SDMADR request message of ARP packet 124D is 10.

In this example, requesting network device 120 may not receive an SDMADR response message from responding network device 122 within a time limit. Accordingly, requesting network device 120 may determine that hardware addresses 25-34 are available, and may reserve hardware addresses 25-34 (e.g., store information in its database indicating that hardware addresses 25-34 are available to be assigned to VMs).

In the example of FIG. 4B, requesting network device 120 determined that requesting network device 120 receive one or more response messages from one or more other network devices specifying all hardware addresses with the range of hardware addresses starting from the target hardware address specified by requesting network device 120 within the time limit. Accordingly, requesting network device 120 may determine that none of the hardware addresses within the range of hardware addresses are available, and generates ARP packet 124B that specifies a new target hardware address.

Figure 4C:
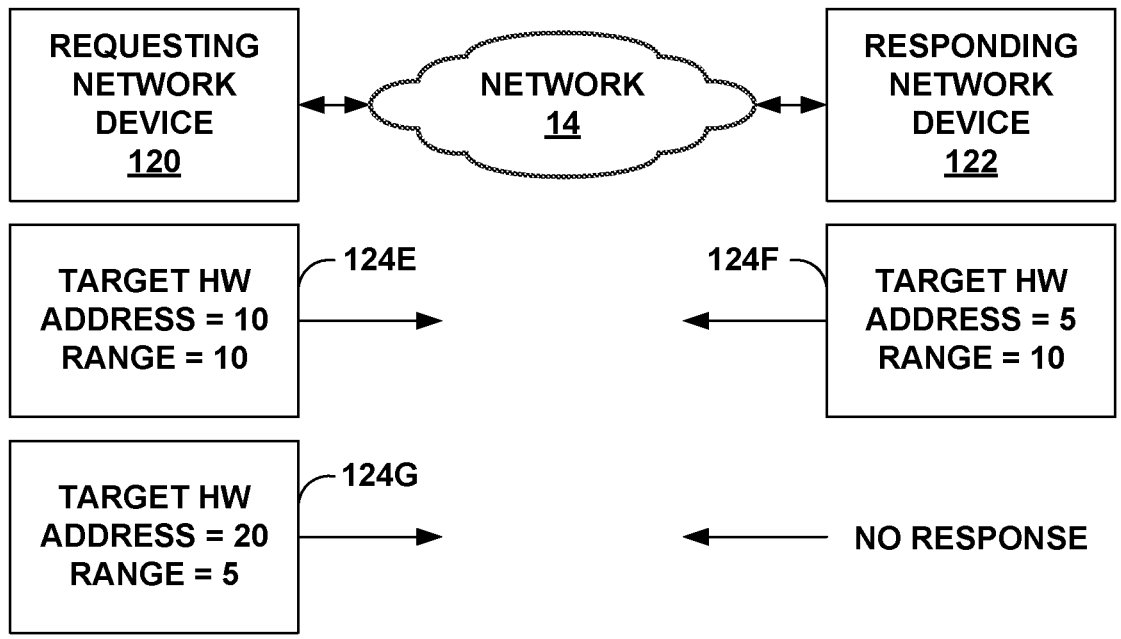

In FIG. 4C, requesting network device 120 generates ARP packet 124E, which is a SDMADR request, similar to ARP packet 124A. In FIG. 4C, within a certain time limit, requesting network device 120 receives ARP packet 124F, which is an SDMADR response. The SDMADR response of ARP packet 124F specifies that responding network device 122 has reserved hardware addresses starting from a target hardware address 5 with a range of 10. In other words, in this example, responding network device 122 has reserved hardware addresses 5-14.

In FIG. 4C, based on ARP packet 124E, requesting network device 120 was requesting for hardware addresses 10-19. However, based on ARP packet 124F, requesting network device 120 may determine that addresses 5-14 are unavailable, and further determine that of the unavailable addresses, addresses 10-14 overlap the addresses specified by requesting network device 120.

In this example, requesting network device 120 may determine that addresses 15-19 are available because only addresses 10-14 of the requested addresses is unavailable. Accordingly, requesting network device 120 may reserve addresses 15-19. If requesting network device 120 needed more addresses, requesting network device 120 generates ARP packet 124G, which is another SDMADR request, but with a target hardware address of 20, and a range of hardware addresses as 5 (e.g., request for hardware addresses 20-24).

In the example of FIG. 4C, requesting network device 120 may not receive any SDMADR responses to its second SDMADR request, and may reserve addresses 20-24. In FIG. 4C, requesting network device 120 may have reserved addresses 15-24 for 10 hardware addresses.

In FIG. 4C, requesting network device 120 received one or more messages from one or more of the other network devices specifying one or more groups of consecutive addresses within the range of hardware addresses within the time limit. For instance, requesting network device 120 received a response message from responding network device 122 specifying a group of consecutive addresses (e.g., 5-14) within the range of hardware addresses specified by requesting network device 120 (e.g., one or more of the addresses 5-14 are within the addresses 10-19 specified by requesting network device 120).

Requesting network device 120 may determine that hardware addresses within the range of hardware addresses excluding hardware addresses within the one or more groups of consecutive addresses are available. For instance, requesting network device 120 may determine that addresses 15-19 are available. In this example, requesting network device 120 may reserve the hardware addresses within the range of hardware addresses excluding hardware addresses within the one or more groups of consecutive addresses. For instance, requesting network device 120 may reserve addresses 15-19.

Figure 4D:
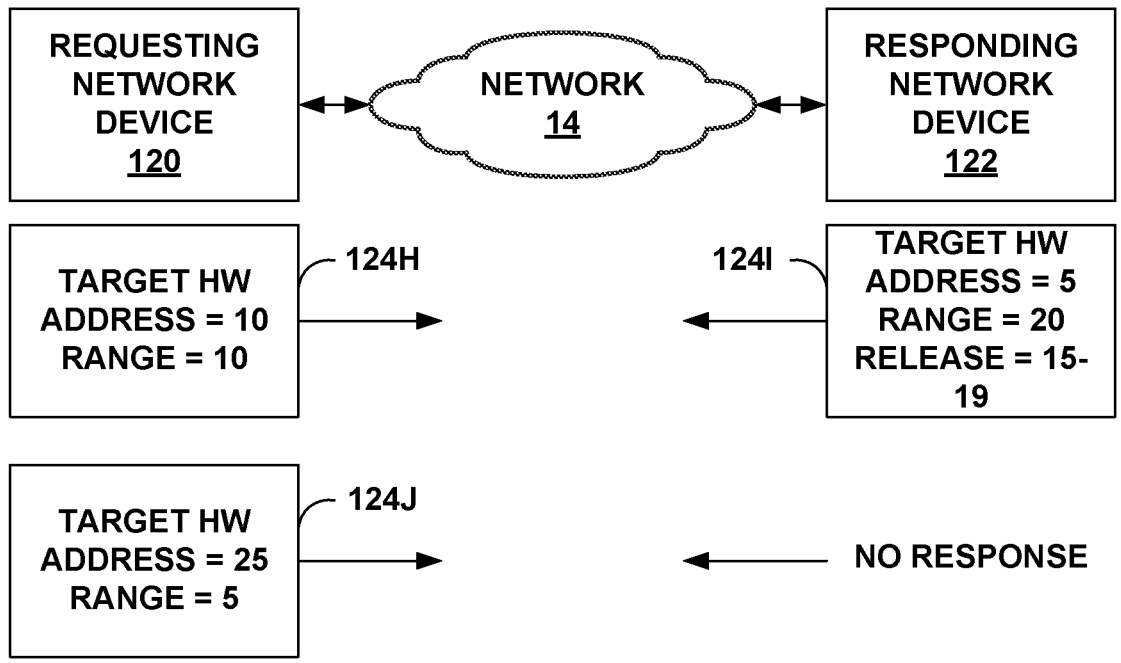

In the example of FIG. 4D, requesting network device 120 generates ARP packet 124H, which is a SDMADR request, similar to ARP packet 124A. In FIG. 4D, within a certain time limit, requesting network device 120 receives ARP packet 124I, which is an SDMADR response. The SDMADR response of ARP packet 124I specifies that responding network device 122 has reserved hardware addresses starting from a target hardware address 5 with a range of 20. In other words, in this example, responding network device 122 has reserved hardware addresses 5-24. The SDMADR response of ARP packet 124I may further specify that responding network device 122 is releasing hardware addresses 15-19.

Accordingly, requesting network device 120 may determine that hardware addresses 15-19 are available, and may reserve hardware addresses 15-19. Requesting network device 120 may generate ARP packet 124J, which is another SDMADR request. The SDMADR request of ARP packet 124J specifies a target hardware address of 25, and a range of hardware addresses of 5. In this example, because responding network device 122 specified that responding network device 122 had reserved addresses 5-24, requesting network device 120 may determine the target hardware address as 25.

There may be a possibility that one of the other responding network devices had previously reserved addresses starting from hardware address 25. However, in the example of FIG. 4D, requesting network device 120 did not receive an SDMADR response message with a time limit. Accordingly, requesting network device 120 may reserve hardware addresses 25-29. In this example, requesting network device 120 reserved hardware addresses 15-19, which were released by responding network device 122, and hardware addresses 25-29, for a total of 10 hardware addresses.

In FIG. 4D, requesting network device 120 received one or more messages from one or more of the other network devices specifying one or more groups of consecutive addresses within the range of hardware addresses within the time limit. For instance, requesting network device 120 received a response message from responding network device 122 specifying a group of consecutive addresses (e.g., 5-24) within the range of hardware addresses specified by requesting network device 120 (e.g., one or more of the addresses 5-24 are within the addresses 10-19 specified by requesting network device 120). However, in this example, requesting network device 120 also received a message specifying hardware addresses that responding network device 122 is releasing (e.g., 15-19).

Requesting network device 120 may determine that hardware addresses within the range of hardware addresses that are released are available. For instance, requesting network device 120 may determine that addresses 15-19 are available. In this example, requesting network device 120 may reserve the hardware addresses within the range of hardware addresses that are released. For instance, requesting network device 120 may reserve addresses 15-19.

Figure 5:
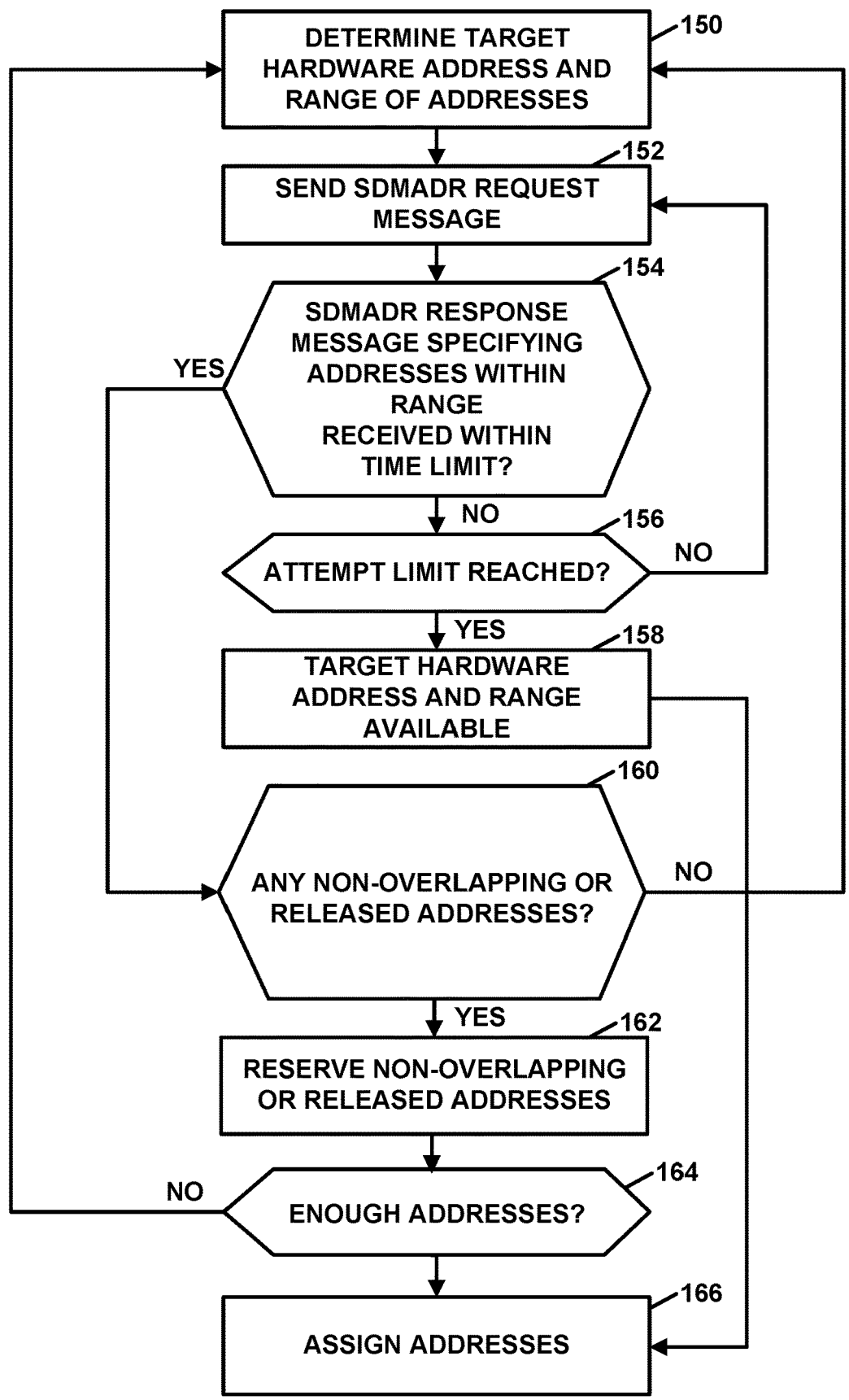
FIG. 5 is a flowchart illustrating an example operation of a requesting network device, in accordance with one or more techniques of this disclosure.

FIG. 5 is a flowchart illustrating an example operation of a requesting network device, in accordance with one or more techniques of this disclosure. The flowcharts of this disclosure are presented as examples. Other examples may include more, fewer, or different actions, or actions may be performed in parallel or different orders. The requesting network device may be local network device 12 of FIG. 1 or requesting network device 120 of FIGS. 4A-4D, any of remote network devices 16, or another device sending a SDMADR request to verify availability of a hardware address.

In the example of FIG. 5, processing circuitry of the requesting network device (e.g., processing circuitry of the requesting network device on which HAAM 26 or VM host software 24 execute) of a plurality of network devices in system 10 determines a target hardware address and a range of hardware addresses starting from the target hardware address (150). For instance, where the requesting network device is not assigning virtual hardware addresses, but is merely verifying that its own hardware address is not assigned to another network device (e.g., virtual machine or other network device) on the network, determining the target hardware address may merely comprise reading a NIC hardware address of a NIC of the requesting network device. In instances where the processing circuitry of the requesting network device is assigning a hardware address (e.g., assigning a virtual hardware address to a VM), the processing circuitry of the requesting network device may determine the target hardware address in various ways. For example, the processing circuitry of the requesting network device may use pseudorandom number generator to determine the target hardware address. In another example, the processing circuitry of the requesting network device may determine the target hardware address by incrementing a previously-assigned virtual hardware address.

After determining the target hardware address, the processing circuitry of the requesting network device may send a SDMADR request message (152). The SDMADR request message specifies the range of hardware addresses starting from the target hardware address. For instance, in the example of FIG. 2, target hardware address field 58 may specify the target hardware address. In the example of FIG. 3, target hardware address field 116 may specify the target hardware address.

The processing circuitry of the requesting network device may then determine whether the requesting network device received one or more response messages from one or more other network devices of the plurality of network devices specifying one or more hardware addresses within the range of hardware addresses within a time limit (154). In various examples, the time limit may have various values. For example, the time limit may be 1 second, 2 seconds, or another length of time.

As one example, the processing circuitry of the requesting network device may determine that the requesting network device did not receive any message from any of the other network devices specifying any of the hardware addresses within the range of hardware addresses within the time limit. As another example, the processing circuitry of the requesting network device may determine that requesting network device received one or more response messages from one or more other network devices of the plurality of network devices specifying all hardware addresses within the second range of hardware addresses starting from the target hardware address within a time limit.

As another example, the processing circuitry of the requesting network device may determine that the requesting network device received one or more messages from one or more of the other network devices specifying one or more groups of consecutive addresses within the range of hardware addresses within the time limit (e.g., the groups of consecutive addresses overlap the range of hardware addresses specified by the requesting network device), but the groups of consecutive addresses may not encompass the entire range of hardware addresses specified by the requesting network device. As another example, the processing circuitry of the requesting network device may determine that the requesting network device received one or more messages from one or more of the other network devices specifying one or more groups of consecutive addresses that are being released.

In one or more examples, the processing circuitry of the requesting network device may determine, based on whether the requesting network device received one or more response messages, whether at least a subset of the hardware addresses within the range of hardware addresses specified by the requesting network device is available. For example, if no response is received, then the processing circuitry of the requesting network device may determine that all hardware addresses in the range of hardware addresses is available (e.g., at least a subset of hardware addresses includes all of the hardware addresses). If there are non-overlapping hardware addresses between the hardware addresses in the response messages and the hardware addresses in the range of hardware addresses, then the processing circuitry of the requesting network device may determine that there are a subset of hardware addresses within the range of hardware addresses that is available (e.g., the subset is hardware addresses excluding the group of consecutive hardware addresses that overlap the range of hardware addresses). If there are released hardware addresses, then the processing circuitry of the requesting network device may determine that there are a subset of hardware addresses within the range of hardware addresses that is available (e.g., subset is the released hardware addresses).

For example, in FIG. 5, if the processing circuitry of the requesting network device does not receive a SDMADR response within the time limit (NO of 154), the processing circuitry of the requesting network device may determine whether an attempt limit has been reached (156). For example, if the processing circuitry of the requesting network device determined that the requesting network device did not receive any message from any of the other network devices specifying any of the hardware addresses within the range of hardware addresses within the time limit, the processing circuitry of the requesting network device may determine whether an attempt limit has been reached. In some examples, the attempt limit is equal to 3, or another value.

In response to determining the attempt limit has not yet been reached (NO of 156), the processing circuitry of the requesting network device may loop back and send another SDMADR request message with the same target hardware address and same range of hardware addresses (152). However, in response to determining that the attempt limit has been reached (YES of 158), the processing circuitry of the requesting network device may determine that the target hardware address is available (160). For example, the processing circuitry of the requesting network device may determine that all hardware addresses within the range of hardware addresses starting from the target hardware address are available. The processing circuitry of the requesting network device may reserve the range of hardware addresses starting from the target hardware address. The processing circuitry of the requesting network device may assign the reserved addresses to one or more VMs executing on the requesting network device (166).

In FIG. 5, if the processing circuitry of the requesting network device receives a SDMADR response specifying one or more hardware addresses within the range of hardware addresses within the time limit (YES of 154), the processing circuitry of the requesting network device may determine whether there are any non-overlapping or released addresses within the range of hardware addresses starting from the target hardware device specified by the requesting network device (160). As one example, the processing circuitry of the requesting network device may determine whether the requesting network device received one or more messages from one or more of the other network devices specifying one or more groups of consecutive addresses within the range of hardware addresses within the time limit. In this example, the processing circuitry of the requesting network device may determine whether there are any hardware addresses within the range of hardware addresses specified by the requesting network device that do not overlap with the one or more groups of consecutive addresses. As another example, the processing circuitry of the requesting network device may determine whether the requesting network device received one or more messages from one or more of the other network devices specifying one or more groups of consecutive addresses within the range of hardware addresses within the time limit that are being released.

If there are no non-overlapping addresses or no released addresses (NO of 160), the processing circuitry of the requesting network device may repeat the example operations of FIG. 5 by selecting a new target hardware address (150). For instance, in this case, all of the hardware addresses in the range of hardware addresses are reserved by other network devices and are not being released.

If there are non-overlapping addresses or released addresses (YES of 160), the processing circuitry of the requesting network device may reserve the non-overlapping or released addresses (162). For instance, in this case, there is at least a subset of the hardware addresses within the range of hardware addresses is available, and the processing circuitry of the requesting network device may reserve the hardware addresses (e.g., in the database).

The processing circuitry of the requesting network device may determine whether there are enough hardware addresses (164). If there are not enough hardware addresses (NO of 164), the processing circuitry of the requesting network device may repeat the example operations of FIG. 5 starting with a new target hardware address, and repeat these example operations until there are sufficient hardware addresses. If there are enough hardware addresses (YES of 164), the processing circuitry of the requesting network device may assign the reserved hardware addresses to VMs executing on the requesting network device (166).

Figure 6A:
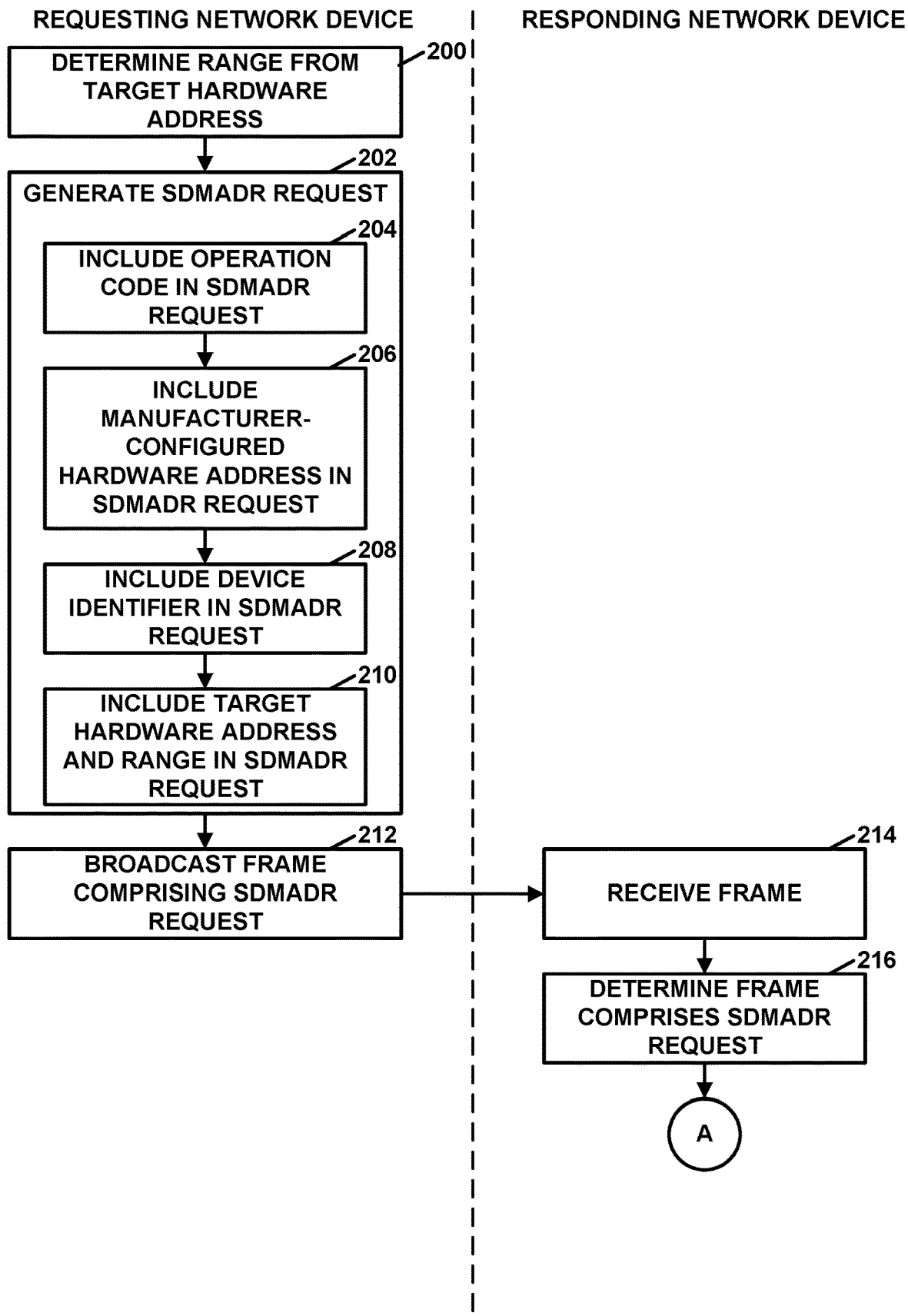
FIG. 6A is a flowchart illustrating an example interaction between a requesting network device and a responding network device to implement a SDMADR protocol in accordance with one or more techniques of this disclosure.
Figure 6B:
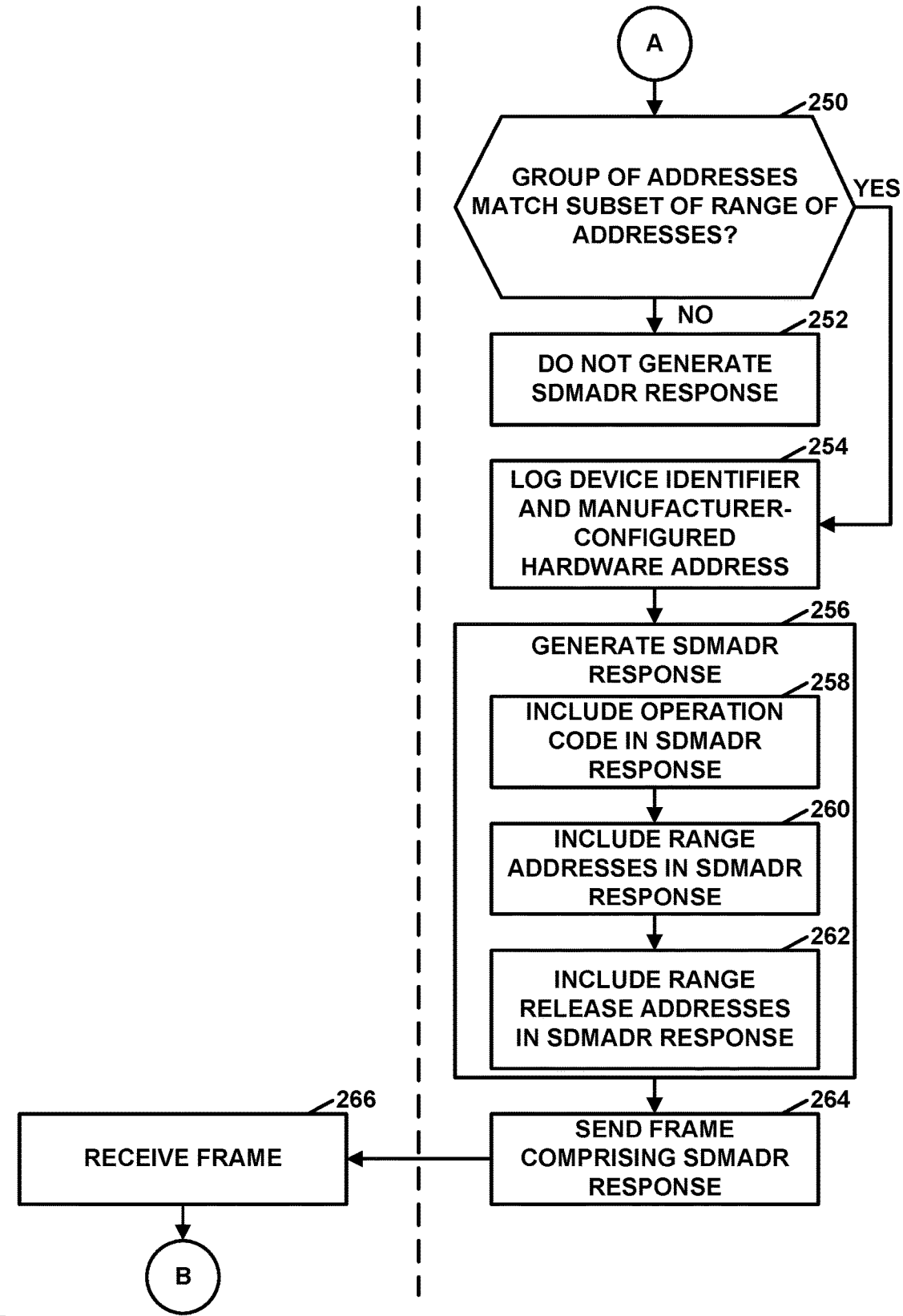
FIG. 6B is a flowchart illustrating a continuation of the example interaction of FIG. 6A.
Figure 6C:
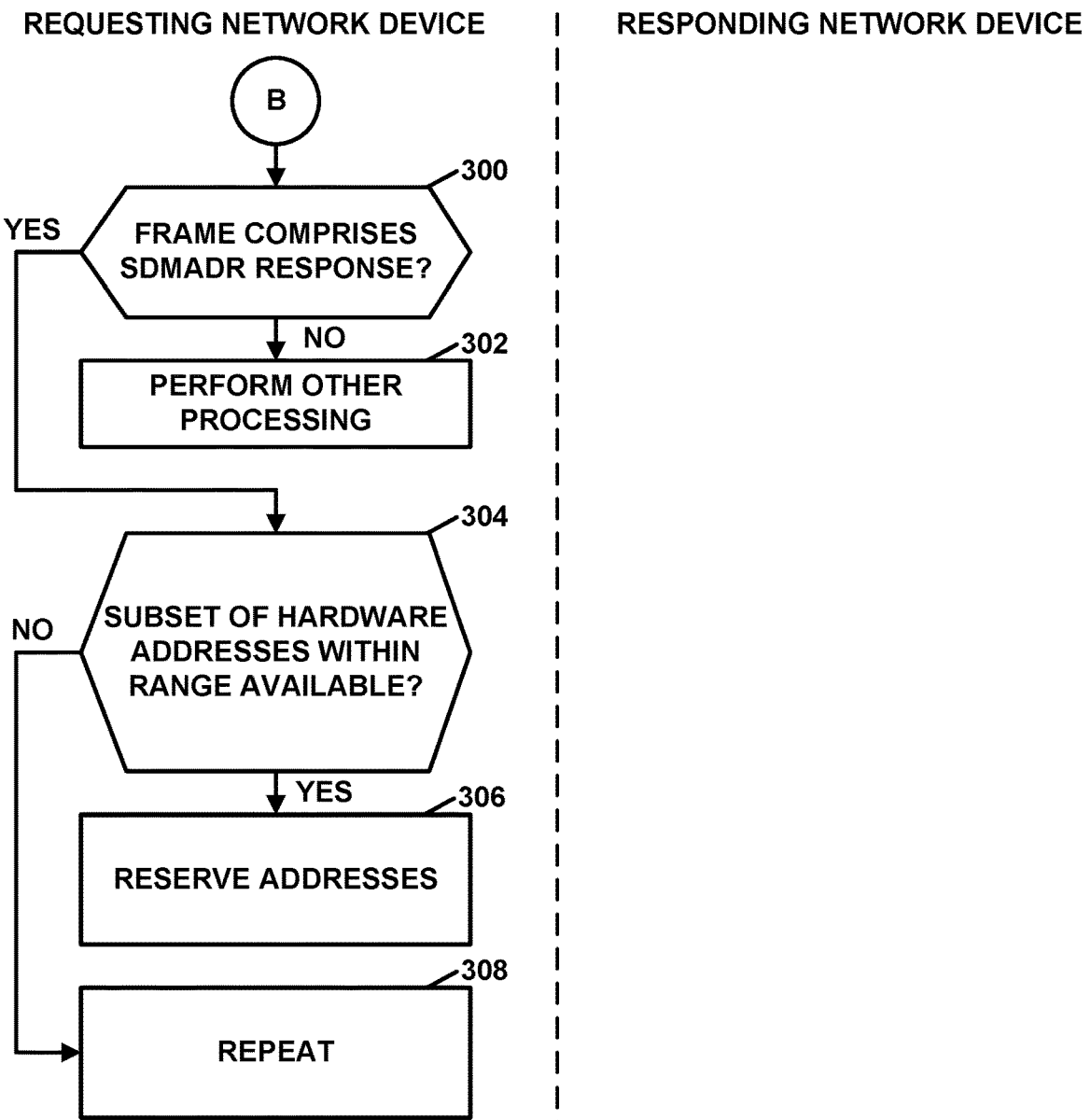
FIG. 6C is a flowchart illustrating a continuation of the example interaction of FIG. 6B.

FIGS. 6A-6C are flowcharts illustrating an example interaction between a requesting network device and a responding network device to implement a SDMADR protocol in accordance with one or more techniques of this disclosure. For ease of explanation, the techniques are described with respect to a requesting network device and a responding network device. In one or more examples, the techniques may be performed by processing circuitry of respective ones of the requesting network device and the responding network device. The processing circuitry may be the circuitry of the requesting network device and the responding network device that perform operations such as receiving, sending, determining, reserving, and the like. The virtual machines and other software modules may also execute on the processing circuitry, or the processing circuitry may include fixed-function circuitry to perform the example techniques.

As shown in the example of FIG. 6A, the requesting network device may determine a range of hardware addresses starting from a target hardware address (200). Additionally, the requesting network device may generate a SDMADR request message (202). As part of generating the SDMADR request message, the requesting network device may include an operation code in the SDMADR request message (204). The operation code may identify the message as a SDMADR request message. The requesting network device may also include a NIC hardware address of the requesting network device in the SDMADR request message (206). For instance, in the context of FIG. 1, the requesting network device may include NIC hardware address 20 in the SDMADR request message. The requesting network device may include the NIC hardware address in sender hardware address field 54 (FIG. 2) or 112A (FIG. 3).

The requesting network device may also include a device identifier in the SDMADR request message (208). For instance, the requesting network device may include the device identifier in device identifier field 56 (FIG. 2) or sender protocol address field 114 (FIG. 3).

Furthermore, the requesting network device may include the target hardware address and the range of hardware addresses in the SDMADR request message (210). For instance, the requesting network device may include the target hardware address in the target hardware address field 58 (FIG. 2) or target hardware address field 116 (FIG. 3).

The requesting network device may include the range of hardware addresses in the range of hardware addresses field 60 (FIG. 2) or the target protocol address field 118 (FIG. 3).

The requesting network device may then broadcast a frame (e.g., an Ethernet frame) comprising the SDMADR request message on a network (212). In other words, the requesting network device may send a frame comprising the SDMADR request message that specifies the broadcast address as the destination address. For instance, requesting network device may specify, in a source hardware address field of the frame, a unicast hardware address reserved from the IANA for use with SDMADR. Subsequently, the responding network device may receive the frame (214). The responding network device may then determine whether the frame comprises a SDMADR request message (216). Assuming that the frame comprises a SDMADR request message, the interaction of FIG. 6A continues as shown in FIG. 6B (as indicated by the circle marked "A").

FIG. 6B is a flowchart illustrating a continuation of the example interaction of FIG. 6A. As shown in the example of FIG. 6B, the responding network device may determine whether the range of addresses of SDMADR request are within group of consecutive addresses of responding device (250). For instance, each responding device may determine whether the range of addresses of the SDMADR request are within any of the consecutive addresses reserved by respective responding device. In other words, each responding device may determine whether a group of consecutive hardware addresses match a subset of the range of hardware addresses of the SDMADR request. The subset of the range of hardware addresses may be some or all of the hardware addresses within the range of hardware addresses. In response to determining that a group of consecutive hardware addresses of the responding network device do not match a subset of the range of hardware addresses (NO of 250), the responding device does not generate a SDMADR response message (252).

On the other hand, in response to determining that the group of consecutive hardware addresses of the network device match the subset of the range of hardware addresses (YES of 250), the responding network device may send a response message specifying the group of consecutive hardware addresses. For example, the responding network device may log a device identifier, NIC hardware address, sender hardware address, and/or target hardware address specified in the SDMADR request message (254).

Furthermore, in response to determining that the group of consecutive hardware addresses of the network device match the subset of the range of hardware addresses, the responding network device may generate a SDMADR response message (256). As part of generating the SDMADR response message, the responding network device may include an operation code in the SDMADR response message (258). The operation code specifies that the message is a SDMADR response message.

Additionally, the responding network device may include information indicating which addresses are remaining reserved by the responding network device in the SDMADR response message (260). For instance, the responding network device may include the starting address of consecutive addresses that the responding network device is reserving in sender hardware address 54 (FIG. 2) or sender hardware address field 112 (FIG. 3), and include a number indicating the number of consecutive addresses that the responding network device is reserving in the first two bytes of the range of hardware addresses field 60 (FIG. 2) or target protocol address field (118).

The responding network device may include information indicating which addresses are being released. For instance, the responding network device may include the starting address of consecutive addresses that the responding network device is releasing in target hardware address field 58 (FIG. 2) or target hardware address field 116 (FIG. 3), and include a number indicating the number of consecutive addresses that the responding network device is releasing in the second two bytes of the range of hardware addresses field 60 (FIG. 2) or target protocol address field (118).

In some examples, a responding device may indicate that the responding device is not releasing any of its reserved addresses. In such examples, target hardware address and the last two bytes of target protocol address may be zero. In some examples, a responding device may indicate that all of the reserved addresses are being released. In such examples, sender hardware address and the first two bytes of the target protocol address may be zero. In some examples, the responding device may keep some of its reserved addresses and release others. Also, information indicating reserved and released addresses may only be sent by a responding device if these addresses partially or fully overlap the addresses requested by the requesting device.

The responding network device may then send a frame (e.g., an Ethernet frame) comprising the SDMADR response message (264). In some examples, the responding network device may broadcast the frame. In some examples, the frame may specify the NIC hardware address specified in the SDMADR request message as the destination address of the frame. Subsequently, the requesting network device may receive the frame (266). The interaction of FIG. 6A and FIG. 6B then continues in FIG. 6C.

FIG. 6C is a flowchart illustrating a continuation of the example interaction of FIG. 6B. In the example of FIG. 6C, the requesting network device may determine whether the frame comprises a SDMADR response message (300). The requesting network device may use the operation code field to determine whether the frame comprises a SDMADR response message. In response to determining the frame does not comprise a SDMADR response message (NO of 300), the requesting network device may perform some other processing on the frame (302), which is outside the scope of this disclosure.

However, in response the determining that the frame comprises a SDMADR response message (YES of 300), the requesting network device may determine whether at least a subset of hardware addresses within the range of hardware addresses specified in the SDMADR request is available (304). For example, the requesting network device may determine whether the SDMADR response message specified a group of consecutive hardware addresses. The requesting network device may determine whether the group of consecutive hardware addresses specified by the responding device fully or partially encompass the range of hardware addresses specified by the requesting device.

If the group of consecutive hardware addresses specified by the responding device fully encompass the range of hardware addresses specified by the requesting device, the responding device may determine that no subset of hardware addresses within the range of hardware addresses specified in the SDMADR request is available (NO of 304). In this example, the requesting network device may repeat the example of FIGS. 6A-6C starting with a different target hardware address (308).

If the group of consecutive hardware addresses specified by the responding device partially encompass the range of hardware addresses specified by the requesting device, the responding device may determine that there is a subset of hardware addresses within the range of hardware addresses specified in the SDMADR request that is available (YES of 304). For example, the subset of hardware addresses within the range of hardware addresses include the range of hardware addresses excluding the group of consecutive hardware addresses specified in the SDMADR response message. The responding device may reserve the subset of hardware addresses (306).

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including processing circuitry implementing one or more processors as described above, in conjunction with suitable software and/or firmware.

Various embodiments of the techniques have been described. These and other embodiments are within the scope of the following claims.

The invention claimed is:

1. A method for detecting hardware address conflicts in a computer network, the method comprising:
   determining, by a network device of a plurality of network devices in the computer network, a range of hardware addresses and a target hardware address;
   sending, by the network device, a request message on a network, the request message specifying the range of hardware addresses and the target hardware address;
   determining, by the network device, whether the network device received one or more response messages from one or more other network devices of the plurality of network devices specifying one or more hardware addresses within the range of hardware addresses starting from the target hardware address within a time limit;
   determining, by the network device, based on whether the network device received the one or more response message, whether at least a subset of the hardware addresses within the range of hardware addresses starting from the target hardware address is available; and
   reserving, by the network device, hardware addresses based on the determination of whether at least the subset of hardware addresses is available.

2. The method of claim 1, further comprising:
   executing, by the network device, one or more virtual machines (VMs); and
   assigning one or more of the reserved hardware addresses to each one of the one or more VMs.

3. The method of claim 1,
   wherein determining whether the network device received one or more response messages comprises determining that the network device did not receive any message from any of the other network devices specifying any of the hardware addresses within the range of hardware addresses starting from the target hardware address within the time limit,
   wherein determining, based on whether the network device received the one or more response message, whether at least a subset of the hardware addresses within the range of hardware addresses starting from the target hardware address is available comprises determining that all hardware addresses within the range of hardware addresses starting from the target hardware address are available, and wherein reserving the hardware addresses comprises reserving all hardware addresses within the range of hardware addresses starting from the target hardware address.

4. The method of claim 1,
wherein determining whether the network device received one or more response messages comprises determining that the network device received one or more messages from one or more of the other network devices specifying one or more groups of consecutive addresses within the range of hardware addresses starting from the target hardware address within the time limit,
wherein determining, based on whether the network device received the one or more response message, whether at least a subset of the hardware addresses within the range of hardware addresses starting from the target hardware address is available comprises determining that hardware addresses within the range of hardware addresses starting from the target hardware address excluding hardware addresses within the one or more groups of consecutive addresses are available, and
wherein reserving the hardware addresses comprises reserving the hardware addresses within the range of hardware addresses excluding hardware addresses within the one or more groups of consecutive addresses.

5. The method of claim 1, wherein the request message comprises a first request message, the target hardware address comprises a first target hardware address, and the range of hardware addresses comprises a first range of hardware addresses, the method further comprising:
determining, by the network device, a second range of hardware addresses and a second target hardware address;
sending, by the network device, a second request message on the network, the second request message specifying the second range of hardware addresses and the second target hardware address;
determining, by the network device, that the network device received one or more response messages from one or more other network devices of the plurality of network devices specifying all hardware addresses within the second range of hardware addresses starting from the second hardware address within a time limit;
determining, by the network device, that none of the hardware addresses within the second range of hardware addresses starting from the second target hardware address are available.

6. The method of claim 1, wherein the target hardware address is a Media Access Control (MAC) address, wherein a number of addresses in the range of hardware addresses is more than two, and wherein the subset of the hardware addresses includes two or more hardware addresses.

7. The method of claim 1, wherein sending the request message comprises:
sending, by the network device, a frame that comprises the request message, the frame having a destination address field specifying a broadcast address.

8. The method of claim 1, wherein the method further comprises:
including, in the request message, a NIC hardware address of the network device, the NIC hardware address being assigned to a network interface card (NIC) of the network device at a time of manufacture of the NIC.

9. The method of claim 1, wherein the request message conforms to an Address Resolution Protocol format.

10. The method of claim 9, wherein sending the request message comprises:
sending, by the network device, an Ethernet frame that comprises the request message, the Ethernet frame having an EtherType field specifying a value corresponding to the Address Resolution Protocol.

11. The method of claim 9, wherein:
the request message comprises a 16-bit hardware address space field, a 16-bit protocol address space field, an 8-bit hardware address length field, an 8-bit protocol address length field, a 16-bit operation code field, a n-bit sender hardware address field, a m-bit sender protocol address field, a n-bit target hardware address field, and a m-bit target protocol address field,
n is defined by the hardware address length field,
m is defined by the protocol address length field,
the operation code field specifying a value indicating that the request message is a duplicate hardware address detection request message for multiple addresses,
the source hardware address field specifies a NIC hardware address of the network device, the NIC hardware address being assigned to a network interface controller (NIC) of the network device at a time of manufacture of the NIC,
the source protocol address field specifies a device identifier of the network device,
the target hardware address field specifying the target hardware address, and
the target protocol address field specifying the range of hardware addresses.

12. The method of claim 1, wherein a response message of the one or more response messages conforms to an Address Resolution Protocol format.

13. The method of claim 12, wherein:
the network device is a first network device,
the range of hardware addresses is a first range of hardware addresses,
the response message comprises a 16-bit hardware address space field, a 16-bit protocol address space field, an 8-bit hardware address length field, an 8-bit protocol address length field, a 16-bit operation code field, a n-bit sender hardware address field, a m-bit sender protocol address field, a n-bit target hardware address field, and a m-bit target protocol address field,
n is defined by the hardware address length field,
m is defined by the protocol address length field,
the operation code field specifying a value indicating that the response message is a duplicate hardware address detection response message for multiple addresses,
the sender hardware address field specifies a start of consecutive addresses being reserved,
the target hardware address field specifies a start of consecutive addresses being released,
the target protocol address field includes four bytes, a first two bytes indicate a number of consecutive addresses being reserved, and a second two bytes indicate a number of consecutive addresses being released.

14. A method for detecting hardware address conflicts in a computer network, the method comprising:
receiving, by a network device, a request message specifying a range of hardware addresses and a target hardware address;
determining, by the network device, whether a group of consecutive hardware addresses of the network device match a subset of the range of hardware addresses starting from the target hardware address; and in response to determining that the group of consecutive hardware addresses of the network device match the subset of the range of hardware addresses starting from the target hardware address, sending, by the network device, a response message specifying the group of consecutive hardware addresses.

15. The method of claim 14, wherein the target hardware address is a Media Access Control (MAC) address, wherein a number of addresses in the range of hardware addresses is more than two, and wherein the subset of the hardware addresses includes two or more hardware addresses.

16. The method of claim 14, wherein receiving the request message comprises receiving, by the network device, a frame having a destination address field specifying a broadcast address.

17. The method of claim 14, wherein the request message conforms to an Address Resolution Protocol format.

18. The method of claim 17, wherein receiving the request message comprises:

receiving, by the network device, an Ethernet frame that comprises the request message, the Ethernet frame having an EtherType field specifying a value corresponding to the Address Resolution Protocol.

19. The method of claim 14, wherein:

the network device is a first network device, the request message comprises a 16-bit hardware address space field, a 16-bit protocol address space field, an 8-bit hardware address length field, an 8-bit protocol address length field, a 16-bit operation code field, a n-bit sender hardware address field, a m-bit sender protocol address field, a n-bit target hardware address field, and a m-bit target protocol address field, n is defined by the hardware address length field, m is defined by the protocol address length field, the operation code field specifying a value indicating that the request message is a duplicate hardware address detection request message for multiple addresses, the source hardware address field specifies a NIC hardware address of a second network device, the NIC hardware address being assigned to a network interface controller (NIC) of the second network device at a time of manufacture of the NIC, the source protocol address field specifies a device identifier of the second network device, the target hardware address field specifying the target hardware address, and the target protocol address field specifying the range of addresses.

20. The method of claim 14, wherein the response message conforms to an Address Resolution Protocol format.

21. The method of claim 20, wherein:

the response message comprises a 16-bit hardware address space field, a 16-bit protocol address space field, an 8-bit hardware address length field, an 8-bit protocol address length field, a 16-bit operation code field, a n-bit sender hardware address field, a m-bit sender protocol address field, a n-bit target hardware address field, and a m-bit target protocol address field, n is defined by the hardware address length field, m is defined by the protocol address length field, the operation code field specifying a value indicating that the response message is a duplicate hardware address detection response message for multiple addresses, the sender hardware address field specifies a start of consecutive addresses being reserved, the target hardware address field specifies a start of consecutive addresses being released, the target protocol address field includes four bytes, a first two bytes indicate a number of consecutive addresses being reserved, and a second two bytes indicate a number of consecutive addresses being released.

22. A network device comprising:

a database; and processing circuitry coupled to the database, the processing circuitry is configured to:

determine a range of hardware addresses and a target hardware address;

send, a request message on a network, the request message specifying the range of hardware addresses and the target hardware address;

determine whether the network device received one or more response messages from one or more other network devices of a plurality of network devices coupled to the network specifying one or more hardware addresses within the range of hardware addresses starting from the target hardware address within a time limit;

determine based on whether the network device received the one or more response message, whether at least a subset of the hardware addresses within the range of hardware addresses starting from the target hardware address is available; and reserve, in the database, hardware addresses based on the determination of whether at least the subset of hardware addresses is available.

23. The network device of claim 22, wherein to determine whether the network device received one or more response messages, the processing circuitry is configured to determine that the network device did not receive any message from any of the other network devices specifying any of the hardware addresses within the range of hardware addresses starting from the target hardware address within the time limit, wherein to determine, based on whether the network device received the one or more response message, whether at least a subset of the hardware addresses within the range of hardware addresses is starting from the target hardware address available, the processing circuitry is configured to determine that all hardware addresses within the range of hardware addresses starting from the target hardware address are available, and wherein to reserve the hardware addresses, the processing circuitry is configured to reserve all hardware addresses within the range of hardware addresses starting from the target hardware address.

24. The network device of claim 22, wherein to determine whether the network device received one or more response messages, the processing circuitry is configured to determine that the network device received one or more messages from one or more of the other network devices specifying one or more groups of consecutive addresses within the range of hardware addresses starting from the target hardware address within the time limit, wherein to determine, based on whether the network device received the one or more response message, whether at least a subset of the hardware addresses within the range of hardware addresses starting from the target hardware address is available, the processing circuitry is configured to determine that hardware addresses within the range of hardware addresses starting from the target hardware address excluding hardware addresses within the one or more groups of consecutive addresses are available, and wherein to reserve the hardware addresses, the processing circuitry is configured to reserve the hardware addresses within the range of hardware addresses excluding hardware addresses within the one or more groups of consecutive addresses.

25. The network device of claim 22, wherein the request message comprises a first request message, the target hardware address comprises a first target hardware address, and the range of hardware addresses comprises a first range of hardware addresses, and wherein the processing circuitry is configured to:

determine a second range of hardware addresses and a second target hardware address;

send a second request message on the network, the second request message specifying the second range of hardware addresses and the second target hardware address;

determine that the network device received one or more response messages from one or more other network devices of the plurality of network devices specifying all hardware addresses within the second range of hardware addresses starting from the second hardware address within a time limit;

determine that none of the hardware addresses within the second range of hardware addresses starting from the target hardware address are available.

26. A network device comprising:

a database; and processing circuitry coupled to the database, the processing circuitry is configured to:

receive a request message specifying a range of hardware addresses and a target hardware address;

determine whether a group of consecutive hardware addresses of the network device match a subset of the range of hardware addresses based on range of addresses starting from the target hardware address stored in the database; and in response to determining that the group of consecutive hardware addresses of the network device match the subset of the range of hardware addresses starting from the target hardware address, send a response message specifying the group of consecutive hardware addresses.

* * * * *